US008838648B2

(12) United States Patent
Sismanis et al.

(10) Patent No.: US 8,838,648 B2
(45) Date of Patent: Sep. 16, 2014

(54) EFFICIENT DISCOVERY OF KEYS IN A DATABASE

(75) Inventors: John Sismanis, San Jose, CA (US); Peter Jay Haas, San Jose, CA (US); Berthold Reinwald, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2322 days.

(21) Appl. No.: 11/465,155

(22) Filed: Aug. 17, 2006

(65) Prior Publication Data

US 2008/0046474 A1 Feb. 21, 2008

(51) Int. Cl.
*G06F 17/30* (2006.01)
*G06F 7/00* (2006.01)

(52) U.S. Cl.
CPC ............................ *G06F 17/30306* (2013.01)
USPC ........... 707/791; 707/797; 707/800; 711/161; 711/162

(58) Field of Classification Search
None
See application file for complete search history.

(56) References Cited

U.S. PATENT DOCUMENTS

| | | | | |
|---|---|---|---|---|
| 6,175,835 | B1 * | 1/2001 | Shadmon | 707/102 |
| 6,208,993 | B1 * | 3/2001 | Shadmon | 707/102 |
| 6,691,120 | B1 * | 2/2004 | Durrant et al. | 707/100 |
| 6,941,303 | B2 * | 9/2005 | Perrizo | 707/6 |
| 7,185,016 | B1 * | 2/2007 | Rasmussen | 1/1 |
| 7,206,789 | B2 * | 4/2007 | Hurmiz et al. | 707/102 |
| 2002/0038306 | A1 * | 3/2002 | Griffin et al. | 707/101 |

OTHER PUBLICATIONS

Yannis Sismanis, et al.; The Polynomial Complexity of Fully Materialized Coalesced Cubes; Proceedings of the 30th VLDB Conference, Toronto, Canada, 2004; pp. 540-551.
Gunopulos, et al.; Discovering All Most Specific Sentences; ACM Transactions on Database Systems, vol. V, No. N; Apr. 2003; pp. 1-36.
Hubtala, et al.; Tune: An Efficient Algorithm for Discovering Functional and Approximate Dependencies; The Computer Journal, vol. 42, No. 2; 1999; pp. 100-111.
Yannis Sismanis, et al.; Gordian: Efficient and Scalable Discovery of Composite Keys (#148); Proceedings of the 32nd VLDB Conference, Seoul, Korea, 2006; pp. 1-12.

* cited by examiner

*Primary Examiner* — Angelica Ruiz
(74) *Attorney, Agent, or Firm* — Schmeiser, Olsen & Watts, LLP

(57) ABSTRACT

A method and system for discovering keys in a database. A minimal set of non-keys of the database are found. The database includes at least two entities and at least two attributes. The minimal set of non-keys includes at least two non-keys. Each entity independently includes a value of each attribute. A set of keys of the database is generated from the minimal set of non-keys. Each key of the generated set of keys independently is a unitary key consisting of one attribute or a composite key consisting of at least two attributes.

20 Claims, 31 Drawing Sheets

| FirstName | LastName | Count |
|---|---|---|
| Michael | Thompson | 2 |
| Sally | Kwan | 1 |
| Michael | Spencer | 1 |

| FirstName | Phone | Count |
|---|---|---|
| Michael | 3478 | 1 |
| Sally | 3478 | 1 |
| Michael | 5237 | 1 |
| Michael | 6791 | 1 |

| FirstName | LastName | Phone | EmpNo | Count |
|---|---|---|---|---|
| Michael | Thompson | 3478 | 10 | 1 |
| Sally | Kwan | 3478 | 20 | 1 |
| Michael | Spencer | 5237 | 90 | 1 |
| Michael | Thompson | 6791 | 50 | 1 |

| Phone | Count |
|---|---|
| 3478 | 2 |
| 5237 | 1 |
| 6791 | 1 |

| EmpNo | Count |
|---|---|
| 10 | 1 |
| 20 | 1 |
| 90 | 1 |
| 50 | 1 |

| FirstName | Count |
|---|---|
| Michael | 3 |
| Sally | 1 |

| LastName | Count |
|---|---|
| Thompson | 2 |
| Kwan | 1 |
| Spencer | 1 |

FIG. 3

| FirstName | LastName | Phone | EmpNo | Count |
|---|---|---|---|---|
| Michael | Thompson | 3478 | 10 | 1 |
| Michael | Spencer | 5237 | 90 | 1 |
| Michael | Thompson | 6791 | 50 | 1 |

| FirstName | LastName | Count |
|---|---|---|
| Michael | Thompson | 2 |
| Michael | Spencer | 1 |

FIG. 4

| LastName | Phone | EmpNo | Count |
|---|---|---|---|
| Thompson | 3478 | 10 | 1 |
| Thompson | 6791 | 50 | 1 |

| LastName | Count |
|---|---|
| Thompson | 2 |

FIG. 5

After Merging Nodes (4) and (5):
(a) 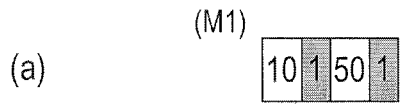
After Merging Nodes (3) and (6):
(b) 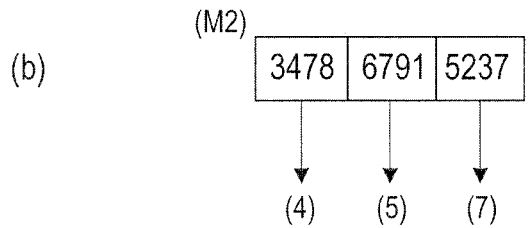
After Merging Nodes (4),(5) and (7):
(c) 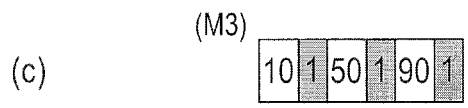
After Merging Nodes (2) and (8):
(d) 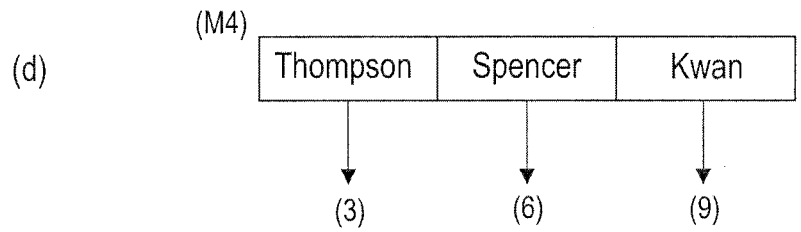
After Merging Nodes (3),(6) and (9):
(e) 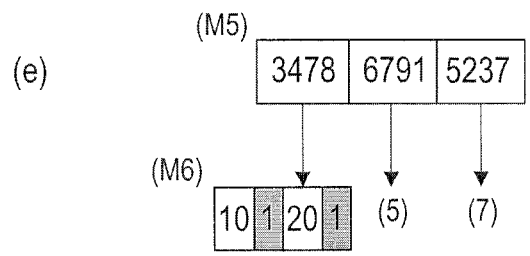
After Merging Nodes (M6),(5) and (7):
(f) 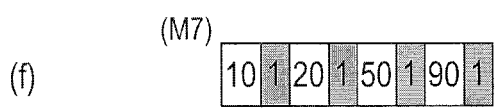
FIG. 8

Algorithm 1: GORDIAN's Method for Finding Non-Keys
1: $t \leftarrow$ root of prefix tree
2: Traverse($t$) // *recursively explore all slices*
3: return
4:
5: Traverse($t$):
6: if at leaf level then
7:    discover and store non-keys // *see Section 3.6*
8: else
9:    for $c$ in Children($t$) do
10:    Traverse($c$) // *explore slices in depth-first order*
11:    end for
12:    Merge($t$) // *explore segments of current slice*
13: end if
14: return
15:
16: Merge($t$):
17: $m \leftarrow$ root of subtree obtained by merging children of $t$ // *see Section 3.2.2*
18: Traverse($m$) // *recursive exploration and merging*
19: Discard($m$) // *discard prefix tree rooted at m*
20: return

FIG. 17

Algorithm 2: Prefix Tree Creation
Input: *DataSet*
1: *root* ← new empty node
2: while there are entities in *DataSet* do
3:     *node* ← *root*
4:     *t* ← next entity of *DataSet*
5:     for each attribute $v_i$ of *t* do
6:        if *node* contains $v_i$ then
7:           *cell* ← cell in *node* containing $v_i$
8:        else
9:           *cell* ← create new cell in *node*
10:          *cell*.count ← 0
11:          *cell*.value ← $v_i$
12:          *cell*.child ← create new node
13:        end if
14:        if $v_i$ is the last attribute of *t* then
15:           make *cell* a leaf
16:           increment *cell*.count by 1
17:           if *cell*.count > 1 then
18:              abort GORDIAN and report that no keys exist
19:           end if
20:        else
21:           *node* ← *cell*.child
22:        end if
23:     end for
24: end while
25: return *root*

FIG. 18

Algorithm 3: Prefix Tree Merging
Input: *toMerge*: set of Prefix-tree nodes
1: if there is only one node in *toMerge* then
2:    *mergedNode* ← (the only) node in *toMerge*
3: else
4:    *mergedNode* ← create new node
5:    for each distinct value $v_i$ in nodes in *toMerge* do
6:       *newCell* ← create new cell in *mergedNode*
7:       *newCell*.value ← $v_i$
8:       if nodes in *toMerge* are leaves then
9:          *newCell*.count ← sum of all counts of cells (in *toMerge*) with values equal to $v_i$
10:       else
11:          *partialSet* ← all the children of the cells (in *toMerge*) with values equal to $v_i$
12:          *newCell*.child ← Merge(*partialSet*)
13:       end if
14:    end for
15: end if
16: return *mergedNode*

FIG. 19

Algorithm 4: NonKeyFinder
Input: *root*: node of the prefix tree, *attrNo*: attribute number
1:  add *attrNo* as part of *curNonKey*
2:  if *root* is leaf then
3:     for each *cell* in *root* do
4:        if *cell*.count /= 1 then
5:           add *curNonKey* to *NonKeySet*
6:           break
7:        end if
8:     end for
9:     remove *attrNo* from *curNonKey*
10:    if *root* has more than one cell or the count of the only cell exceeds 1 then
11:       add *curNonKey* to *NonKeySet*
12:    end if
13: else
14:    if there is only one entity then
15:       return
16:    end if
17:       for each *cell* in *root* do
18:          if *cell*.child is not a shared prefix tree then
19:             NonKeyFinder(*cell*.child,*attrNo* +1)
20:          end if
21:       end for
22:       remove *attrNo* from *curNonKey*
23:       if there is more than one cell in *root* then
24:          if *curNonKey* is futile then
25:             return
26:          end if
27:          *mergeTree* ← Merge all the children of the cells in *root*
28:          NonKeyFinder(*mergeTree,attrNo* +1)
29:          discard *mergeTree*
30:       end if
31: end if

FIG. 20

Algorithm 5: *NonKeySet* Insertion
Input: *NonKey*: non-key to insert, *NonKeySet*: container of non-keys
1: *toAdd* ← true
2: for each non-key *nk* in *NonKeySet* do
3:    if *nk* covers *NonKey* then
4:       *toAdd* ← false
5:       break
6:    end if
7: end for
8: if *toAdd* is true then
9:    for each non-key *nk* in *NonKeySet* do
10:      if *NonKey* covers *nk* then
11:         remove *nk* from *NonKeySet*
12:      end if
13:    end for
14:    add *NonKey* in *NonKeySet*
15: end if

FIG. 21

Algorithm 6: Obtaining the Keys from the Non-Keys
Input: *NonKeySet*: container of non-keys
1:   *KeySet* ← 0
2:   for each *NonKey* in *NonKeySet* do
3:     *complementSet* ← complement of *NonKey*
4:     if *KeySet* = 0 then
5:       *KeySet* ← *complementSet*
6:     else
7:       *newSet* ← 0
8:       for each *pKey* in *complementSet* do
9:         for each *Key* in *KeySet* do
10:           insert ( *Key* union *pKey* ) into *newSet*
11:         end for
12:       end for
13:       simplify *newSet*
14:       *KeySet* ← *newSet*
15:     end if
16:   end for
17:   return *KeySet*

FIG. 22

EFFICIENT DISCOVERY OF KEYS IN A DATABASE

FIELD OF THE INVENTION

The present invention provides a method and system for discovering keys in a database.

BACKGROUND OF THE INVENTION

Keys play a fundamental role in understanding both the structure and properties of data. Given a collection of entities, a key may represent one or more attribute(s) whose value(s) uniquely identifies an entity in the collection. For example, a key for a relational table may represent a column such that no two rows have matching values in the column. The notion of keys carries over into many other settings, such as XML repositories, document collections, and object databases. Identification of keys is an important task in many areas of modern data management, including data modeling, query optimization, indexing, anomaly detection, and data integration. The knowledge of keys can be used to: (1) provide better selectivity estimates in cost-based query optimization; (2) provide a query optimizer with new access paths that can lead to substantial speedups in query processing; (3) allow the database administrator (DBA) to improve the efficiency of data access via physical design techniques such as data partitioning or the creation of indexes and materialized views; (4) provide new insights into application data; and (5) automate the data-integration process.

Unfortunately, in real-world scenarios with large, complex databases, an explicit list of keys is often incomplete, if available at all.

Keys may be unknown to the DBMS, due to any of the following reasons: (1) the key represents a "constraint" or "dependency" that is inherent to the data domain but unknown to both the application developer and the database administrator (DBA); (2) the key arises fortuitously from the statistical properties of the data, and hence is unknown to the application developer and DBA; (3) the key is known and exploited by the application without the DBA explicitly knowing about the key; (4) the DBA knows about the key but for reasons of cost chooses not to explicitly identify or enforce the key. The unknown keys in a database may represent a loss of valuable information.

Thus, there is a need for an efficient method and system for discovering keys in a database.

SUMMARY OF THE INVENTION

The present invention provides a method for discovering keys in a database, said method comprising:

finding a minimal set of non-keys of the database, said database comprising a plurality of entities and a plurality of attributes, said minimal set of non-keys comprising a plurality of non-keys, each entity independently comprising a value of each attribute; and generating a set of keys of the database from the minimal set of non-keys, each key of the generated set of keys independently being a unitary key consisting of one attribute of the plurality of attributes or a composite key consisting of at least two attributes of the plurality of attributes.

The present invention provides a computer program product, comprising a computer usable medium having a computer readable program code embodied therein, said computer readable program code containing instructions that when executed by a processor of a computer system implement a method for discovering keys in a database, said method comprising:

finding a minimal set of non-keys of the database, said database comprising a plurality of entities and a plurality of attributes, said minimal set of non-keys comprising a plurality of non-keys, each entity independently comprising a value of each attribute; and generating a set of keys of the database from the minimal set of non-keys, each key of the generated set of keys independently being a unitary key consisting of one attribute of the plurality of attributes or a composite key consisting of at least two attributes of the plurality of attributes.

The present invention provides a computer system comprising a processor and a computer readable memory unit coupled to the processor, said memory unit containing instructions that when executed by the processor implement a method for discovering keys in a database, said method comprising:

finding a minimal set of non-keys of the database, said database comprising a plurality of entities and a plurality of attributes, said minimal set of non-keys comprising a plurality of non-keys, each entity independently comprising a value of each attribute; and generating a set of keys of the database from the minimal set of non-keys, each key of the generated set of keys independently being a unitary key consisting of one attribute of the plurality of attributes or a composite key consisting of at least two attributes of the plurality of attributes.

The present invention advantageously provides a method and system for discovering keys in a database.

BRIEF DESCRIPTION OF THE DRAWINGS

FIG. 3 depicts some possible projections of the dataset of FIG. 1 for the count aggregate function, in accordance with embodiments of the present invention.

FIGS. 4 and 5 each depict segments that correspond to a slice computed from the dataset of FIG. 1, in accordance with embodiments of the present invention.

FIG. 8 depicts the results of various merges performed on the data of FIG. 6, in accordance with embodiments of the present invention.

FIG. 17 depicts pseudocode of Algorithm 1, which is a high-level, simplified algorithm for finding non-keys, in accordance with embodiments of the present invention.

FIG. 18 depicts pseudocode of Algorithm 2, which creates a prefix-tree representation from an input set of entities, in accordance with embodiments of the present invention.

FIG. 19 depicts pseudocode of Algorithm 3, which is an efficient algorithm for merging nodes to create a modified tree, in accordance with embodiments of the present invention.

FIG. 20 depicts pseudocode of Algorithm 4, which is an algorithm for finding non-keys, in accordance with embodiments of the present invention.

FIG. 21 depicts pseudocode of Algorithm 5, which is an algorithm for inserting a non-key into the container that holds a current set of non-redundant non-keys during non-key finder processing, in accordance with embodiments of the present invention.

FIG. 22 depicts pseudocode of Algorithm 6, which performs the conversion from non-keys to keys, in accordance with embodiments of the present invention.

DETAILED DESCRIPTION OF THE INVENTION

1. Introduction

Figure 1:
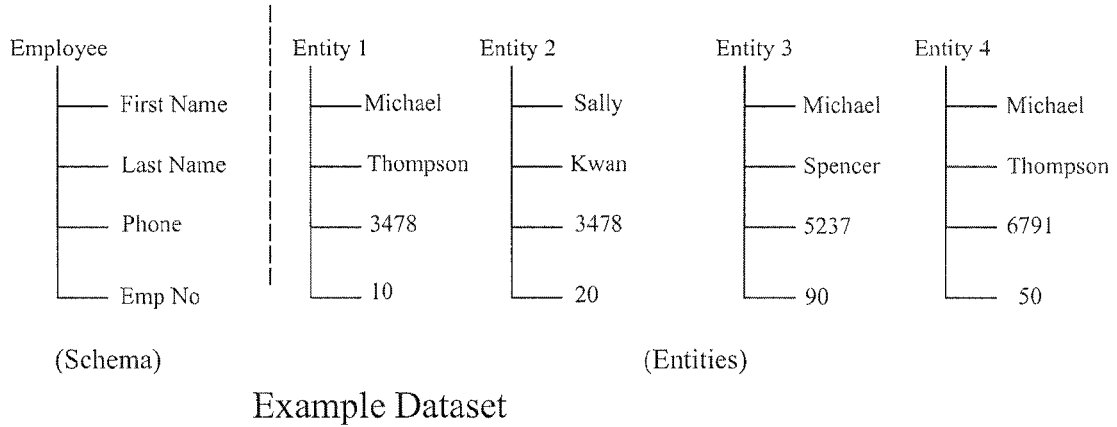
FIG. 1 depicts a dataset of entities, in accordance with embodiments of the present invention.

Data in a database comprises data collections (e.g., tables). Each data collection is characterized by entities and attributes of the entities. Each entity independently comprises a value of each attribute. For example, the entities may each represent a unique employee of an organization, and the attributes of each entity (i.e., each employee in this example) may comprise the employee's name, gender, social security number, etc. For a data collection formatted as a table, the entities may each represent a column and the attributes may each represent a row. Alternatively, the entities may each represent a row and the attributes may each represent a column. In one embodiment, the database comprises a plurality of entities and a plurality of attributes.

A key is a set of attributes whose values uniquely identify each entity in the data collection. The present invention includes both unitary keys (i.e., keys consisting of one attribute) and composite keys (i.e.; keys consisting of two or more attributes). An example of a composite key is a key consisting of the attributes of gender and social security number.

The present invention introduces the Gordian algorithm for efficiently discovering unitary and composite keys in a collection of entities. The Gordian algorithm represents a vast improvement over currently used techniques to determine keys. Moreover, the ability of the Gordian algorithm to discover composite keys is a novel contribution inasmuch as the related art has not addressed the problem of composite key discovery.

In experiments performed by the inventors of the present invention, the Gordian algorithm performed well on both real-world and synthetic databases with large numbers of both attributes and entities. As discussed infra, it can even be shown that the Gordian algorithm, when restricted to a certain class of generalized Zipfian datasets, has a time complexity that is polynomial in both the number of entities and attributes.

The basic idea behind the Gordian algorithm is to formulate the problem as a cube computation problem and then to interleave the cube computation with the discovery of all non-keys. Non-keys are attributes that are not keys. The cube operator acting on a dataset encapsulates all possible projections of a dataset while computing aggregate functions on the projected entities. A projection of a dataset is a subset of the attribute values of the dataset for all entities of the dataset to which the subset applies. An example of an aggregate function is the COUNT function which is the number of entities comprising a same set attribute values. For a discussion of the cube computation problem generally and not specifically in the context of the present invention, see J. Gray, S. Chaudhuri, A. Bosworth, A. Layman, D. Reichart, M. Venkatrao, F. Pellow, and H. Pirahesh. Data cube: A relational aggregation operator generalizing group-by, cross-tab, and sub-totals. *J. Data Mining and Knowledge Discovery*, 1(1):29-53, 1997.

The Gordian algorithm efficiently computes the complement of this collection of non-keys, yielding the desired set of keys. For the Gordian algorithm, the cube computation corresponds to the computation of the entity counts for all possible attribute projections of a given dataset. From such counts, whether or not a projection corresponds to a composite key can be identified. Many optimizations are possible during the cube computation, because the present invention is not concerned with storing, indexing, or even fully computing the cube. Working with non-keys instead of keys is advantageous for a couple of reasons. First, a non-key can often be identified after looking at only a subset of the entities. Unlike keys, a discovered non-key cannot subsequently be "invalidated" as more entities are examined. Second, any subset of the attributes in a non-key is also a non-key, so that the Gordian algorithm can apply pruning techniques that can reduce the time and space requirements by orders of magnitude. Finally, experiments by the inventors of the present invention show that when the Gordian algorithm is applied to a relatively small sample of the data, the algorithm discovers a high-quality set of "approximate" keys.

The remainder of the detailed description of the present invention is organized as follows. Section 2 discusses concepts related to keys and non-keys, and presents an example to illustrate keys and non-keys. Section 3 comprises a description and analysis of the Gordian algorithm. Section 4 contains the results of an empirical evaluation of the Gordian algorithm on both synthetic and real-world datasets. Section 5 discusses related work Section 6 summarizes conclusions. Section 6 discusses a computer system in which the present invention may be implemented.

2. Keys and Non-Keys

Given a schema (i.e., set of attributes) R, a subset K of R and a dataset of entities E over R, K is a key if and only if for any t, u ∈ E, t[K]=u[K] only if t=u. In other words, K is a key when the values of the attributes K of entity t are all equal to the values of the corresponding attributes of entity u only when the values of the attributes R of entity t are all equal to the values of the corresponding attributes of entity u. Similarly, K⊆R is a non-key if and only if there exist t, u ∈ r such that t[K]=u[K] and t≠u. In other words, K is a non-key when there are two entities t,u such that the values of the attributes K of entity t are all equal to the values of the corresponding attributes in u, while at the same time the values of attributes R of entity t are not all equal to the values of the corresponding attributes of entity u. If K is a key of attributes, then the projection of E onto the attributes in K (with duplicate removal) results in an entity-set of the same size as E. If K is a non-key, then the projection of E onto the attributes in K results in an entity-set strictly smaller than E.

FIG. 1 depicts a dataset of entities E, in accordance with embodiments of the present invention. The dataset of entities E in FIG. 1 comprises the four entities (Entity 1, Entity 2, Entity 3, Entity 4) having the attributes of (First Name, Last Name, Phone, Emp No). In the dataset of FIG. 1, [Emp No] is a key, because Emp No uniquely identifies an employee. Moreover, [Last Name, Phone] is a composite key. A projection on either of these keys results in a set comprising four entities. Because more than one (i.e, three) entities share the first name 'Michael', it follows that K=[First Name] is a non-key. A projection on First Name results in a set containing only two entities.

If K⊆R is a non-key with respect to a dataset of entities E and K'⊆K, then K' is a non-key. For example, if [First Name, Last Name] is a non-key (because there are two Michael Thompsons), then [First Name] is a non-key (there are at least two Michaels) and [Last Name] is a non-key (there are at least two Thompsons). By definition, K covers K' or, equivalently K' is redundant to K, if K'⊆K, which means that the attributes of K' is a subset of the attributes of K. By definition, a set of non-keys {$K_1, K_2, \ldots$} is non-redundant or minimal if and only if $K_j \not\subseteq K_i$ for all i≠j; i.e., if and only if no non-key in the set is covered by another non-key in the set. Similarly by definition, a set of keys is non-redundant or minimal if and only if no key in the set is covered by another key in the set. The non-redundant non-keys for this running example are [Phone] and [First Name, Last Name]. As part of its operation, the Gordian algorithm may maintain a NonKeySet container that holds a set of non-redundant non-keys, as discussed infra in Section 3.6.

Non-keys are easier to identify than keys. Suppose, for example, that the first three entities in the example dataset have been examined, and that [First Name] has been determined to be a non-key with respect to the entities processed so far. Then it is therefore known that [First Name] must be a non-key with respect to the entire dataset. Keys, on the other hand, do not have this nice property. Suppose that the first three entities in the example dataset have been examined, and that [Last Name] has been determined to be a key with respect to the entities processed so far. Then, at any point in the future, this property might be invalidated by some entity that we has not been encountered or processed yet. Indeed, the preceding mechanism for directly identifying keys (rather than non-keys) does not discover that [Last Name] is actually not a key until after the final entity has been examined.

The Gordian algorithm converts non-keys to keys during the final stage of its operation, and the following definitions are pertinent to this process. The complement of a non-key is the set of single-attribute keys that correspond to the attributes not appearing in K and provides the starting point for converting non-keys to keys. Formally, C(K)={<a>:a ∈ R\K}. For example, the complement of the non-key [First Name, Last Name] is the set {[Phone], [Emp No]}. The covering relationship for keys is the reverse of the relationship for non-keys: a key K' is redundant to a key K if K⊆K'. A non-redundant set of keys is defined analogously to the definition of a non-redundant set of non-keys.

3. The Gordian Algorithm

In this section, the complete Gordian algorithm is presented. First, an overview of the Gordian algorithm is given, explaining the intuition behind the approach of the Gordian algorithm, followed by a description of the details of the Gordian algorithm in subsequent subsections.

3.1 Overview of the Gordian Algorithm

A dataset may be represented as a hierarchy called a "prefix tree" having a nodal structure such that each node consists of one or more "cells". The prefix tree comprises a root node at the initial or starting level of the hierarchy giving rise to sequences of child nodes descending from the root node, and leaf nodes (i.e., terminal nodes) having no child nodes emerging therefrom. A prefix tree has the characteristic that all descendants (e.g., child nodes) of any one node have a common prefix of the path through the tree from the root node to the any one node.

3.1.1 Using the CUBE Operator

The Gordian algorithm utilizes the cube operator to discover keys. As explained supra, the cube operator encapsulates all possible projections of a dataset while computing aggregate functions on the projected entities. FIG. 3 depicts some possible projections of the dataset of FIG. 1 for the count aggregate function, in accordance with embodiments of the present invention. Note that a projection corresponds to a key if and only if all the count aggregates for a projection are equal to 1. For example, [EmpNo] and [First Name, Phone] each have COUNT=1 for all rows of the projection and therefore are keys, while [First Name, Last Name] is a non-key since the "Michael" "Thomson" row has COUNT=2

3.1.2 Singleton Pruning Overview

The Gordian algorithm exploits a novel form of powerful pruning, called singleton pruning, which is based on a slice-by-slice computation of the cube. A slice of the cube is defined as a sub-cube of the cube of the dataset, said subset being defined by a given node, wherein the slice encompasses all projections of the cube defined by the given node and by all child nodes of the given node. The projections comprised by the slice are called segments of the slice. Thus, a slice may be identified by identification of the given node or equivalently by a contiguous path of cells from the root node to the given node.

FIG. 4 depicts segments that correspond to a slice F computed from the dataset of FIG. 1, in accordance with embodiments of the present invention. Only some of the segments of F are shown in FIG. 4. This slice F of the cube corresponds to First Name=Michael.

FIG. 5 depicts segments that correspond to a slice L of the cube that corresponds to Last Name=Thompson, in accordance with embodiments of the present invention. Because (in the full dataset) the value 'Thompson' appears only with the value 'Michael', it follows that the slice L is subsumed by the slice F, in the sense that all the segments of L already appear in F with just the First Name attribute 'Michael' prepended to them. Therefore, a second slice is subsumed by a first slice if the segments comprised by the second slice constitute a subset of the segments comprised by the first slice. Thus all the aggregate counts of L appear in F (with 'Michael' prepended). It follows that any non-keys of L appear in F with the additional attribute First Name. Therefore, as discussed supra in Section 2, each non-key of L is redundant to some non-key of F. Indeed in this example, the slice F contains the non-key [First Name, Last Name] and the slice L contains the (redundant) non-key [Last Name]. This observation leads to the following lemma:

Lemma 1 If a slice L is subsumed by another slice F then each non-key of L is redundant to some non-key of F.

This preceding simple yet powerful lemma enables Gordian algorithm to avoid all computation and traversal of subsumed slices, without the need to consult the NonKeySet container. See infra Section 3.4.1 for details.

3.1.3 Futility Pruning Overview

Futility pruning complements singleton pruning, using a repository of the non-keys discovered so far to avoid computing segments of future slices. For example, if at some time it is determined that [First Name, Last Name] is a non-key (e.g., by finding an aggregate count greater than 1 for a set of attribute values within the segment [First Name, Last Name]), then the computation of the [First Name, Last Name] segments, as well as the [First Name] and [Last Name] segments, is suppressed when processing future slices. Such prunings are denoted as futile prunings; see infra Section 3.4.2 for details.

3.1.4 Computing Projections Using Prefix Trees

Figure 2:
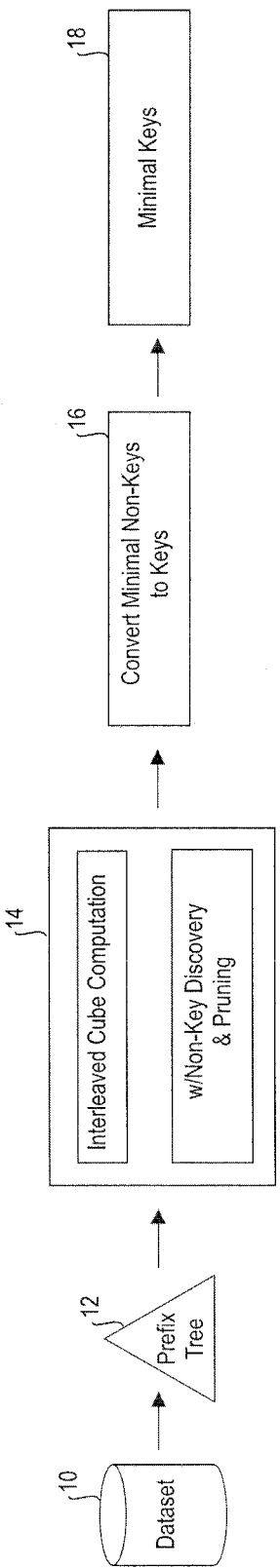
FIG. 2 is a flow chart depicting the general flow of the Gordian algorithm, in accordance with embodiments of the present invention.

FIG. 2 is a flow chart depicting the general flow of the Gordian algorithm, in accordance with embodiments of the present invention. First, the dataset 10 is compressed into a compact representation called a prefix tree 12 during a single pass through the data. Paths in the tree that share the same 'prefix' (i.e., the same path from the root node to a given node) are only stored once; hence the name prefix tree. The prefix tree representation (see infra Section 3.2) minimizes both space and processing requirements and facilitates efficient singleton pruning. Using the prefix tree, a non-key finder 14 process is performed to determine the non-keys comprised by the database 10. The Gordian algorithm, while computing the cube aggregates, keeps track of the discovered non-redundant non-keys and performs a conversion 16 of the discovered non-keys to a set of non-redundant keys, resulting in a minimal set of keys 18.

Figure 6:
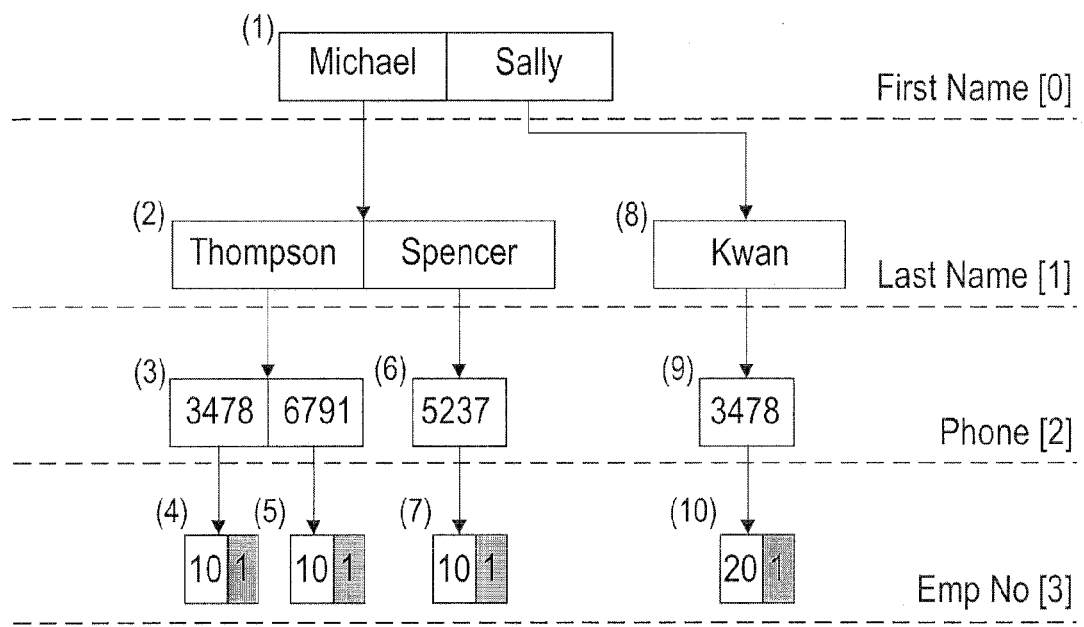
FIG. 6 shows a prefix tree for the dataset of FIG. 1, in accordance with embodiments of the present invention.

FIG. 6 shows the prefix tree for the dataset of FIG. 1, in accordance with embodiments of the present invention. As can be seen in FIG. 6, each level (0, 1, 2, 3) of the tree corresponds to an attribute in the schema (First Name, Last Name, Phone, Emp No). The "attribute number" for each attribute is also the level number and is displayed in square brackets (e.g., [0] for level 0); the attrNo variable in the NonKeyFinder algorithm refers to these values. Each node of the prefix tree contains a variable number of cells, wherein each cell contains a value in the domain of the attribute corresponding to the node's level; the values within the cells of a node are distinct. Each non-leaf cell has a pointer to a single child node. The idea is that there is a one-to-one correspondence between the set of unique root-to-leaf paths in the tree and the set of unique entities in the dataset.

Leaf-node cells have, in addition to a value, an associated counter represented by a shaded box in the FIG. 6. This counter records the number of times the entity corresponding to the root-to-leaf path appears in the dataset. Nodes are numbered in depth-first order; node numbers in FIG. 6 appear in parentheses (e.g., (1) for node 1). Algorithms for creating and manipulating prefix trees are given supra in Section 3.2.1. Although not depicted here, each cell of the prefix tree also records the sum of the counters over all leaf nodes that are descended from the cell; this structural information is used for pruning (see infra Section 3.4).

FIG. 17 depicts pseudocode of Algorithm 1, which is a high-level, simplified algorithm for finding non-keys, in accordance with embodiments of the present invention. The pseudocode of Algorithm 1 suppresses any explicit mention of pruning (see infra Section 3.4 for a discussion of pruning).

Figure 23:
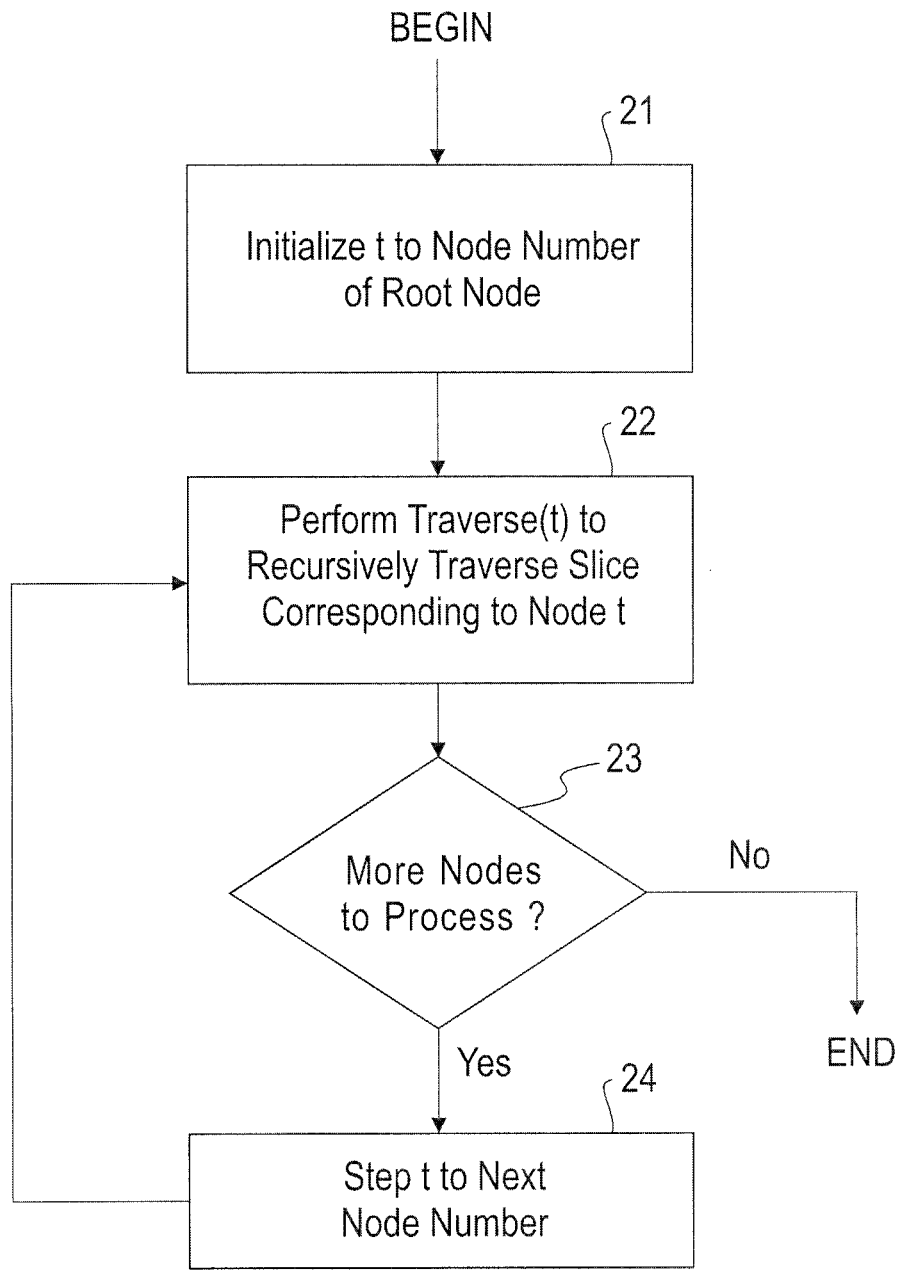
FIGS. 23-24 are flow charts based on the pseudocode of Algorithm 1 in FIG. 17 for finding non-keys, in accordance with embodiments of the present invention.
Figure 24:
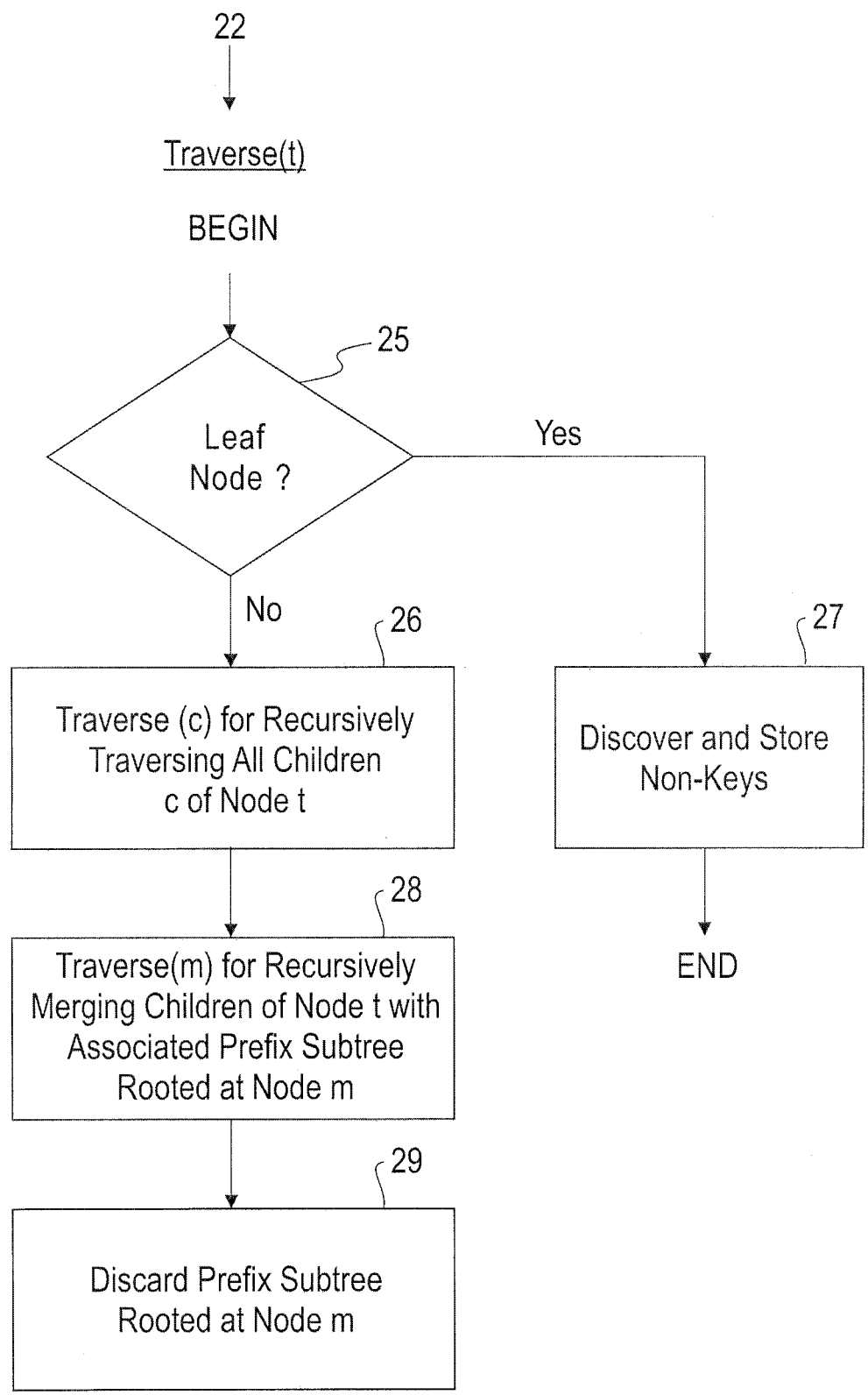

FIGS. 23-24 are flow charts based on the pseudocode of Algorithm 1 in FIG. 17 for finding non-keys, in accordance with embodiments of the present invention. FIG. 23 comprises steps 21-24, wherein the index t denotes node number of a node in the prefix tree. Step 21 initializes t to the node number of the root node (i.e., t is initialized to node 1 in the prefix tree of FIG. 6). Step 22 performs the Transverse(t) function which recursively traverses the slice of the prefix tree that corresponds to node t. Step 23 determines whether any nodes remain of the prefix tree to be processed. If step 23 determines that no nodes remain to be processed then the process ends; otherwise, step 24 steps t to the next node number (e.g., t+1) followed by looping back to step 22 to perform Traverse(t) for the next node.

FIG. 24 depicts the Traverse(t) procedure of step 22 in FIG. 23 and comprises steps 25-29. Step 25 determines whether node t is a leaf node. If step 23 determines that node t is a leaf node then step 27 discovers non-keys associated with node t and then exits from Traverse (t); otherwise, steps 26, 28, and 29 are next executed. The non-keys associated with leaf node t have more than one cell or have one cell with a count exceeding 1, as will be explained infra in conjunction with Algorithm 4 in FIG. 20. Step 26 recursively invokes Traverse (c) to traverse all child nodes c of node t. Step 28 invokes Traverse (m) which recursively traverses and merges the child nodes of the subtree whose root is indexed by m. Each merge of child nodes of node t generates a subtree whose root is designated by the index m Step 29 discards the prefix subtree whose root is indexed by m. Thus Traverse (t) is characterized by two recursive calls to itself, which occur at steps 26 and step 28.

Although FIGS. 23-24 depict Traverse (t) as implementing a recursive traversal of a slice of the prefix tree, including the two recursive calls noted supra, the scope of the present invention includes implementation of counter-controlled looping as an alternative to recursion. A person of ordinary skill in the art could convert the pseudocode of Algorithm 1 in FIG. 17, and the flow charts in FIGS. 23-24, to code and logic that employs counter-controlled looping to implement the process of the present invention for finding non-keys.

FIG. 20 depicts pseudocode of Algorithm 4, which is a detailed algorithm for finding non-keys, in accordance with embodiments of the present invention. In the pseudocode of Algorithm 4, many of the traversal and merge steps are not actually executed. Moreover, the Algorithm 4 combines the traversal and merge functionality, displayed separately in Algorithm 1, in a compact and efficient manner.

Figure 7:
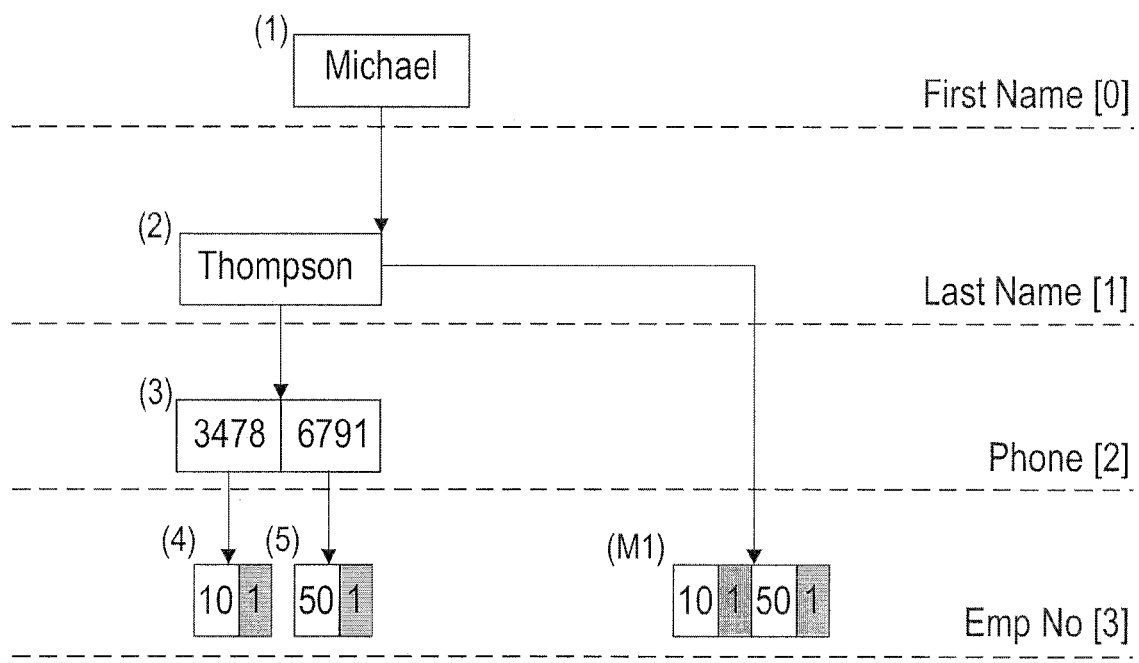
FIG. 7 depicts an exemplary merge of the children of a slice of the dataset of FIG. 1, in accordance with embodiments of the present invention.

The Gordian algorithm begins by performing a depth-first (DF) traversal of the prefix tree (i.e., depth traversal in order of 0, 1, 2, . . . )) that visits each node. When all the children of a visited node are traversed, the slice of the cube that corresponds to the path from the root node to the visited node is computed by recursively merging the children of the visited node. Each merge operation corresponds to the computation of a different segment (i.e., projection) for the slice defined by the path from the root node to the visited node or to a given cell of the visited node. For example, for the prefix tree in FIG. 6, assume that all the children of node (3) have been visited. The path "Michael, Thompson, {3748,6791}," from the root node (1) to the node {3748, 6791} (which is node (3)) identifies the current slice. By recursively merging the children of node (3), all the segments for that slice are computed. FIG. 7 depicts an exemplary merge of the children of the slice "Michael, Thompson", in accordance with embodiments of the present invention.

The doubly recursive nature of the Gordian algorithm (one recursion visits all the nodes and the other recursion merges the children of a visited node) guarantees that, if no singleton or futility pruning is performed, all possible segments for all slices will be generated and traversed. This property provides also an informal sketch of the correctness of the Gordian algorithm: all possible projections are processed and all non-keys are discovered. The details of the merging operation are given infra in Section 3.2.2, and the details of how the Gordian algorithm performs the doubly recursive DF-traversal are explained infra in Section 3.3. The operation of the Non-KeySet container, which maintains a non-redundant set of non-keys, is described infra in Section 3.6. The final step of the Gordian algorithm is to compute a non-redundant set of keys from the set of non-keys in the NonKeySet container; this procedure is described infra in Section 3.7.

3.2 Prefix-Tree Operations

This section describes how the Gordian algorithm creates prefix trees and merges nodes.

3.2.1 Creating a Prefix Tree

FIG. 18 depicts pseudocode of Algorithm 2, which creates a prefix-tree representation from an input set of entities, in accordance with embodiments of the present invention. Algorithm 2 requires only a single pass through the data. Variable root holds the root of the prefix tree, variable node holds the current node and variable cell the current cell in node.

Algorithm 2 begins by creating the root node of the tree, i.e., node (1). Initially, node (1) is empty and contains no cells at all. For each entity processed, the variable node is set to root (line 3). For each attribute value v of this entity, either new cell (line 9) is created and inserted the value $v_i$, or the cell in node that has value equal to $v_i$ (line 7) is located. In either case, the subtree rooted at the cell is recursively populated with the remaining attributes of the entity.

As discussed supra, if the Gordian algorithm ever increases the count of a leaf-node cell (e.g., wherein the count is illustrated in the shaded cells in the leaf nodes in FIG. 6) to a value greater than 1, then the dataset has no keys at all, in which case the Gordian algorithm aborts its processing and reports that the dataset has no keys (lines 17-18).

Note that different prefix-tree representations are possible, depending upon the order in which attributes are scanned. The Gordian algorithm finds all keys regardless of scanning order, and experiments indicate that The Gordian algorithm's performance is relatively insensitive to the choice of scanning order. One heuristic is to processes attributes in descending order of their cardinality in the dataset, in order to maximize the amount of pruning at lower levels of the prefix tree.

Figure 25:
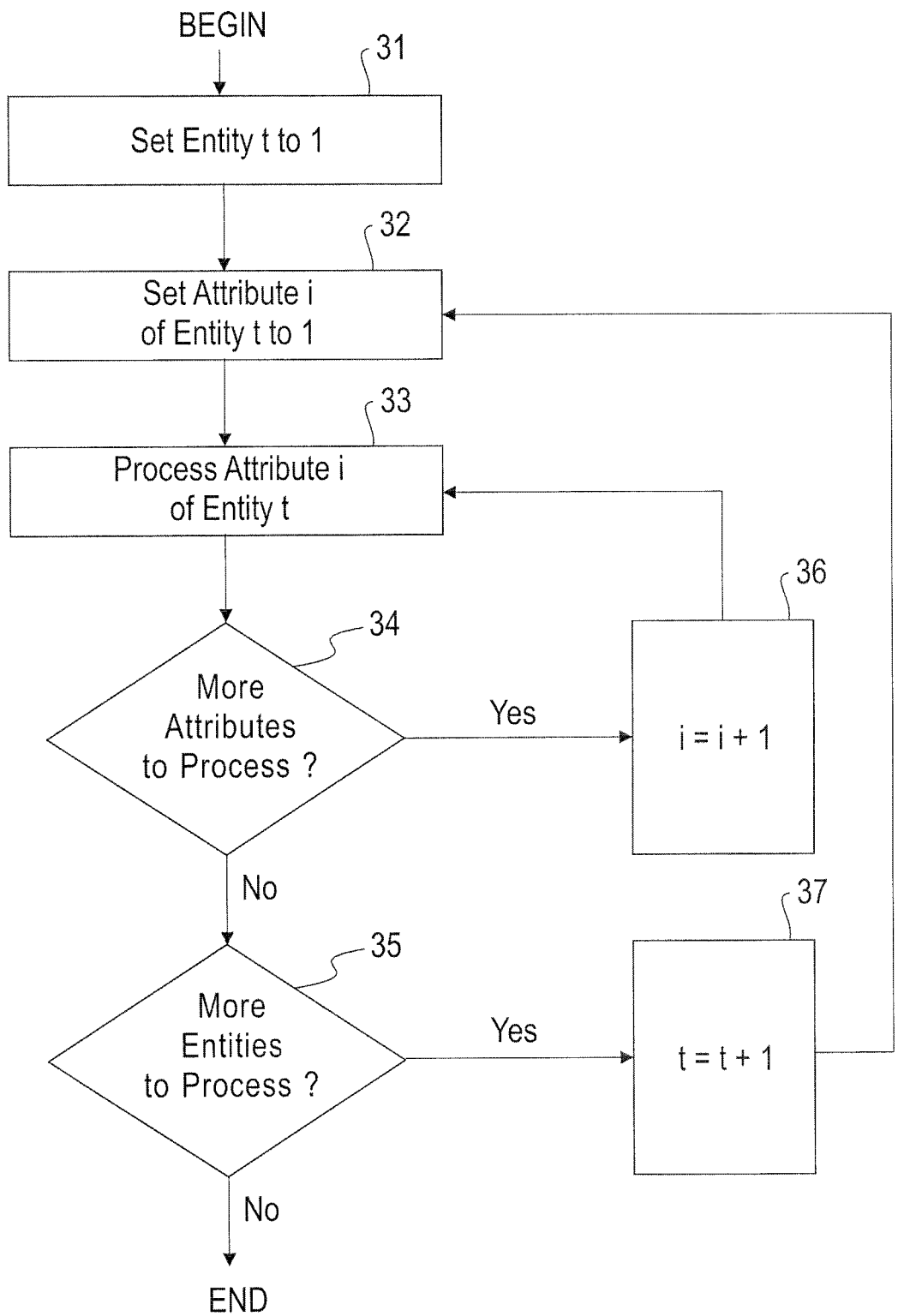
FIGS. 25-26 are flow charts based on the pseudocode of Algorithm 2 in FIG. 18 for creating a prefix-tree, in accordance with embodiments of the present invention.
Figure 26:
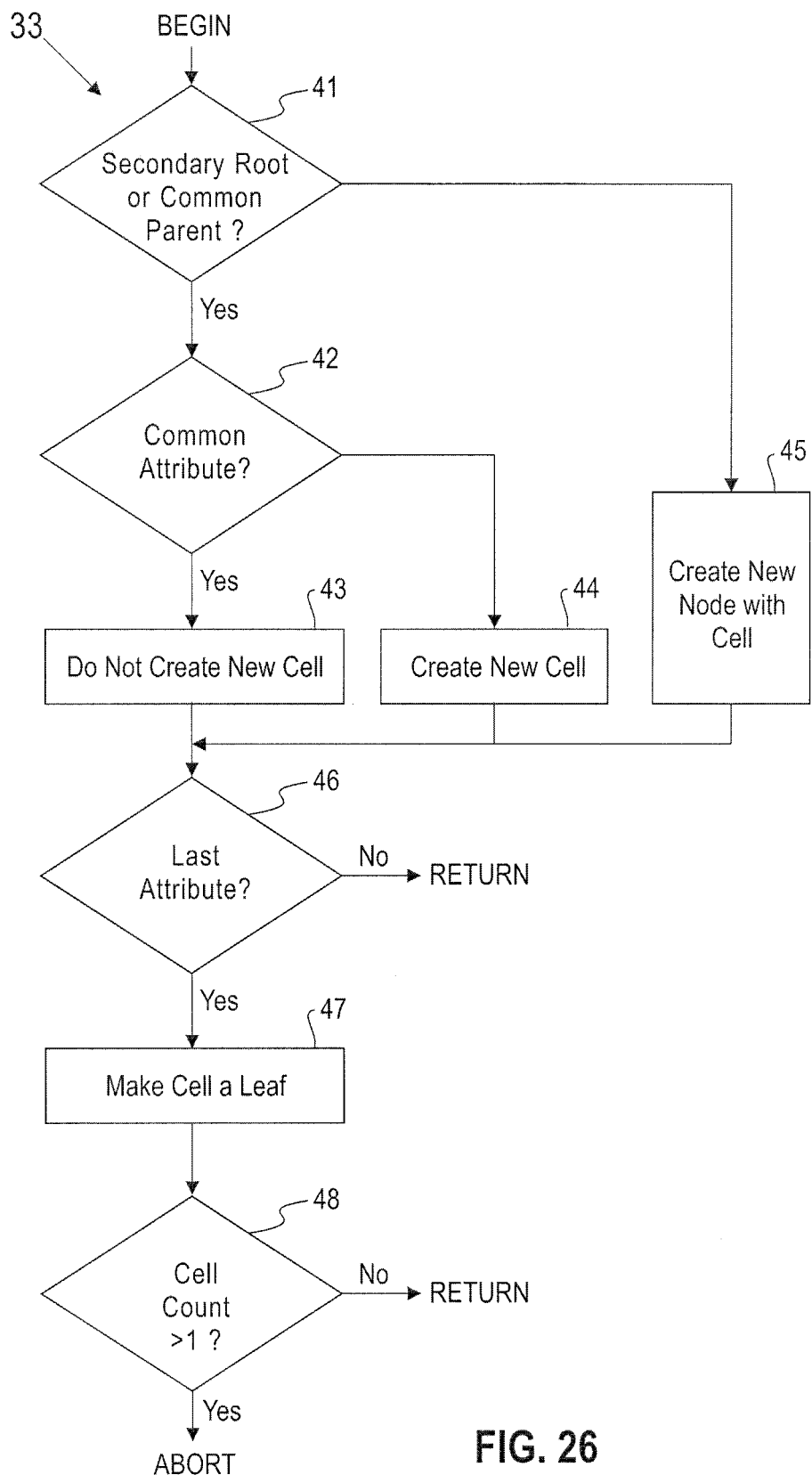

FIGS. 25-26 are flow charts based on the pseudocode of Algorithm 2 in FIG. 18 for creating a prefix tree, in accordance with embodiments of the present invention. FIG. 25 comprises steps 31-37, wherein the index t denotes an entity number and the index i denotes an attribute number. Step 31 initializes the entity number t to 1. Step 32 initializes the attribute number i to 1. Step 33 processes attribute i of entity t, which places the attribute i of entity t in a cell within the prefix tree being generated. Step 34 determines whether there are more attributes of entity t to process. If step 34 determines that there are more attributes of entity t to process, then i is incremented to the next attribute (i.e., i is incremented by 1) and the process loops back to step 33 to process the next attribute of the entity t. If step 34 determines that there are no more attributes of entity t to process then step 35 is next executed. Step 35 whether there is at least one more entity to process. If step 35 determines that there is at least one more entity to process, then t is incremented to the next entity (i.e., t is incremented by 1) and the process loops back to step 32 to process the next entity. If step 35 determines that there are no more of entities to process, then the process of FIG. 25 ends.

In the dataset of FIG. 1, there are four entities (i.e., t=1, 2, 3, 4) and each entity has 4 attributes (i.e., i=1, 2, 3, 4) corresponding to the attributes of First Name, Last Name, Phone, and Emp No, respectively. Thus for the processing of the dataset of FIG. 1 to generate the prefix tree of FIG. 6, the flow chart of FIG. 25 indicates that the entities are processed in the sequential ordering of t=1, 2, 3, 4, and for each value of t the attributes are processed in sequential ordering of i=1, 2, 3, 4. Thus, for the index pair (t,i), the processing is ordered according to (1,1), (1,2), (1,3), (1,4), (2,1), (2,2), (3,3), (4,4), (3,1), (3,2), (3,3), (3,4), (4,1), (4,2), (4,3), (4,4).

Note that attributes in the dataset will be hierarchically ordered in the generated prefix tree in accordance with the order in which the attributes appear in the dataset, and this hierarchical ordering is captured in the hierarchy represented in the generated prefix tree as expressed in terms of parent-child relationships. In the dataset of FIG. 1, for example, the attributes of First Name, Last Name, Phone, and Emp No imply a hierarchical ordering in the prefix tree such that First Name—Last Name denotes in a parent-child relationship, wherein First Name is the parent and Last Name is the child. Similarly, Last Name—Phone and Phone—Emp No each denote a parent-child relationship.

For each entity, the first attribute appearing in the dataset is a "root attribute". Thus for the entities of FIG. 1, the first attribute of First Name is a root attribute. The root attribute of the first entity processed is called a primary root attribute and the remaining root attributes processed are called secondary root attributes. Thus for the entities of FIG. 1, the root attribute of entity 1 (having value of Michael) is a primary root entity, and the root attributes of entities 2, 3, 4 (having values Sally, Michael, Michael, respectively) are secondary root attributes. A cell of the prefix tree containing a root attribute is called a "root cell", and a node containing root cells is called a "root node".

For each entity, the last attribute appearing in the dataset is a "leaf attribute". Thus for the entities of FIG. 1, the last attribute of Emp No is a leaf attribute. A cell of the prefix tree containing a leaf attribute is called a "leaf cell", and a node containing leaf cells is called a "leaf node".

As may be seen in the prefix tree of FIG. 6, the prefix tree has hierarchical levels ([0], [1], [2], [3]) having the same sequential ordering as the sequential ordering of the attributes (First Name, Last Name, Phone, and Emp No) in the dataset.

FIG. 26 depicts in more detail step 33 of FIG. 25 for processing attribute i of entity t, which inserts attribute i of entity t into a cell of the prefix tree being generated. The flow chart of FIG. 26 comprises steps 41-48.

Step 41 determines whether attribute i of entity t is a secondary root attribute or does not have a common parent attribute. A common parent attribute of a given attribute is defined as a parent attribute of the given attribute such that the parent attribute has the same value as the value of a previously processed attribute at the same hierarchical level as the parent attribute. For example, for the dataset of FIG. 1 and the associated prefix tree of FIG. 6, the given attribute of Last Name for entity 3 (whose value is Spencer) has a common parent attribute, because the parent attribute (First Name) of the given attribute (Last Name) has the same value (Michael) for entity 3 as the value (Michael) of the previously processed attribute of entity 1 at the same hierarchical level [0].

If step 41 determines that attribute i of entity t is not a secondary root attribute and does not have a common parent attribute, then step 45 is next processed to create a new node with an associated new cell into which the value of attribute i of entity t is inserted, followed by execution of step 46. This newly created node is a root node if attribute i of entity t is a root attribute (i.e., a primary root attribute), and wherein this newly created node is not a root node if attribute i of entity t is a not a root attribute.

If step 41 determines that attribute i of entity t is a secondary root attribute or has a common parent attribute, then there must be an existing node into which the value of attribute i of entity t is to be inserted in accordance with step 42. If attribute i of entity t is a secondary root attribute, then the existing node is the root node. If attribute i of entity t has a common parent attribute, then the existing cell is a node, other than the root node, which includes an attribute whose parent attribute has the same value as the value of the common parent attribute.

Step 42 determines whether the value of attribute i of entity t contained within an existing cell of the existing node. If step 41 determines that the value of attribute i of entity t is not contained within an existing cell of the existing node, then step 44 creates a new cell in the existing node and inserts the value of attribute i of entity t into the new cell of the existing node, and step 46 is next processed. If step 41 determines that the value of attribute i of entity t is contained within an existing cell of the existing node, then step 43 inhibits creation of a new cell in the existing node and further inhibits explicit insertion of the value of attribute i of entity t into any cell of the existing node, because the value of attribute i of entity t is already in a cell of the existing node, and step 46 is next processed.

Step 46 determines whether attribute i of entity t is the last attribute of entity t. For example, Emp No is the last attribute of each entity in the dataset of FIG. 1. If step 46 determines that attribute i of entity t is not the last attribute of entity t, then the process of FIG. 26 ends and control is returned to step 34 of FIG. 25. If step 46 determines that attribute i of entity t is the last attribute of entity t and thus a leaf attribute, then step 47 makes the cell containing the value of leaf attribute i of entity a leaf cell if said cell is not already a leaf cell, and step 48 is next processed.

Step 48 determines whether the pertinent leaf node containing the value of attribute i of entity t has a cell count (i.e., number of cells in the pertinent leaf node) exceeding 1. If step 48 determines that the pertinent leaf node containing the value of attribute i of entity t does not have a cell count exceeding 1, then the process of FIG. 26 ends and control is returned to step 34 of FIG. 25. If step 48 determines that the pertinent leaf node containing the value of attribute i of entity t has a cell count exceeding 1, then the dataset being processed cannot have any keys and the overall process of generating keys for this dataset is aborted.

The flow chart of FIG. 26 will next be selectively applied to the dataset of FIG. 1 to illustrate various sequences of steps in the flow chart of FIG. 26 for generating the prefix tree of FIG. 6.

The sequence of steps 41-45-46 is illustrated by the processing of attribute 1 of entity 1 (i.e., First Name=Michael for entity 1), which is a primary root attribute. Therefore, step 41 determines attribute 1 of entity 1 does not have a common parent attribute. Then step 45 creates a new node (1) with a new cell containing Michael as shown in FIG. 6. Since attribute 1 of entity 1 is not the last attribute (Emp No) of attribute 1, the result of executing step 46 is returning from FIG. 26 to step 34 of FIG. 25.

The sequence of steps 41-45-46-47-48 is illustrated by the processing of attribute 4 of entity 1 (i.e., Emp No=10 for entity 1). As is evident from FIG. 1, step 41 determines that attribute 4 of entity 1 is not a secondary root attribute and does not have a common parent attribute. Note that although the Phone attribute has the same value (3478) for entity I and entity 2, attribute 4 of entity 1 does not have a common parent because the attributes of entity 2 have not yet been processed when attribute 4 of entity 1 is processed. Then step 45 creates a new node (4) with a new cell containing 10 as shown in FIG. 6. Since attribute 4 of entity 1 is the last attribute (Emp No) of attribute 1 and thus a leaf attribute, the result of executing step 46 results in execution of step 47 (making the newly created cell in step 45 a leaf cell), followed by step 48. Step 48 determines that the cell count does not exceed 1; thus the result of executing step 48 is returning from FIG. 26 to step 34 of FIG. 25.

The sequence of steps 41-42-44 is illustrated by the processing of attribute 1 of entity 2 (i.e., First Name=Sally for entity 2), which is a secondary root attribute. Therefore, step 41 determines that attribute 1 of entity 2 is a secondary root attribute and there is an existing node (1) into which the value (Sally) of attribute 1 of entity 2 is to be inserted in accordance with step 42. Step 42 determines that the value (Sally) of attribute 1 of entity 2 is not contained within an existing cell of the existing node (1), because attribute 1 of entity 2 has a value of Sally and the existing node (1) comprises only the value of Michael. Then step 44 creates a new cell in the existing node (1) for insertion of the value Sally as shown in FIG. 6.

The sequence of steps 41-42-43 is illustrated by the processing of attribute 1 of entity 3 (i.e., First Name=Michael for entity 3), which is a secondary root attribute. Therefore, step 41 determines that attribute 1 of entity 1 is a secondary root attribute and there is an existing node (1) into which the value (Michael) of attribute 1 of entity 3 is to be inserted in accordance with step 42. Step 42 determines that the value (Michael) of attribute 1 of entity 3 is contained within an existing cell of the existing node (1), because attribute 1 of entity 3 has a value of Michael and the existing node (1) already comprises the value of Michael. Then step 43 inhibits creation of a new cell in the existing node (1) and further inhibits explicit insertion of the value (Michael) of attribute 1 of entity 3 into any cell of the existing node, because the value (Michael) of attribute 1 of entity 3 is already in a cell of the existing node.

The sequence of steps 41-42-44 is again illustrated by the processing of attribute 2 of entity 3 (i.e., Last Name=Spencer for entity 3), which is a not a root attribute but has a common parent attribute whose value is Michael. Therefore, step 41 determines that attribute 2 of entity 3 has a common parent attribute and there is an existing node (2) into which the value (Spencer) of attribute 2 of entity 3 is to be inserted in accordance with step 42. Step 42 determines that the value (Spencer) of attribute 2 of entity 3 is not contained within an existing cell of the existing node (2), because attribute 2 of entity 3 has a value of Spencer and the existing node (2) comprises only the value of Thompson. Then step 44 creates a new cell in the existing node (2) for insertion of the value Spencer as shown in FIG. 6.

The sequence of steps 41-42-43 is again illustrated by the processing of attribute 2 of entity 4 (i.e., Last Name=Thompson for entity 4), which is not a root attribute but has a common parent attribute whose value is Michael. Therefore, step 41 determines that attribute 2 of entity 4 has a common parent attribute (Michael) and there is an existing node (2) into which the value (Thompson) of attribute 2 of entity 4 is to be inserted in accordance with step 42. Step 42 determines that the value (Thompson) of attribute 2 of entity 4 is contained within an existing cell of the existing node (2), because attribute 2 of entity 4 has a value of Thompson and the existing node (2) comprises already comprises the value of Thompson. Then step 44 inhibits creation create a new cell in the existing node (2) and further inhibits explicit insertion of the value (Thompson) of attribute 2 of entity 4 into any cell of the existing node, because the value (Thompson) of attribute 2 of entity 4 is already in a cell of the existing node.

3.2.2 Merging Prefix Trees

FIG. 19 depicts pseudocode of Algorithm 3, which is an efficient algorithm for merging nodes to create a modified tree, in accordance with embodiments of the present invention. The merge algorithm of FIG. 19 takes as input a set of nodes that are to be merged. If the set of nodes consists of a single node, then the algorithm immediately returns this single node (line 2). The algorithm merges all of the nodes of the input, creating and returning only one node (mergedNode). If the nodes to be merged are leaves, then for each distinct value v that appears in more than one cell, the algorithm creates a new cell in the merged node with value equal to v, and sets the cell count equal to the sum of counter values over all input cells having value v (line 9). Otherwise for non-leaf nodes, the algorithm proceeds by recursively merging the child nodes for each set of cells that share the same value (line 12).

For example, when merging nodes (2) and (8), the algorithm creates a new node that has enough cells to accommodate all the distinct values that appear in nodes (2) and (8). Specifically, the algorithm creates three cells with values 'Thompson', 'Spencer' and 'Kwan', respectively. Then the algorithm proceeds recursively for 'Thompson' to merge node (3). However, there is only one node (3) to merge, so the algorithm immediately returns a reference to node (3). The same happens for the child pointers of 'Spencer' and 'Kwan', i.e., nodes (6) and (9) are returned, respectively. The result of merging nodes (2) and (8) is shown in FIG. 8, which depicts the results of various merges performed on the data of FIG. 6, in accordance with embodiments of the present invention. FIG. 8 depicts the results (a), (b), (c), (d), (e), and (f) of six associated merges as shown. Hereinafter, FIG. 8, result (x) is denoted as FIG. 8(*x*), wherein x stands for "a", "b", "c", "d", "e", or "f". For example, FIG. 8(*d*) denotes FIG. 8, result (d).

The merging operation minimizes space consumption by avoiding unnecessary duplication of nodes. For example in FIG. 8(*d*), the newly created node (M4) points to the existing nodes (3), (6), and (9) and these nodes are shared, rather than duplicated. As discussed in Section 3.3 infra, care needs to be taken when discarding a node, because it might be a shared node. Nonetheless, this inconvenience is vastly outweighed by the space-saving advantages.

When running the merge Algorithm 3 on real datasets, most of the merge steps may be degenerate if there is only one node to be merged. This scenario holds especially for sparse datasets with a large number of attributes. In the dataset of FIG. 8, most merges generate a prefix tree with just a single node.

Figure 27:
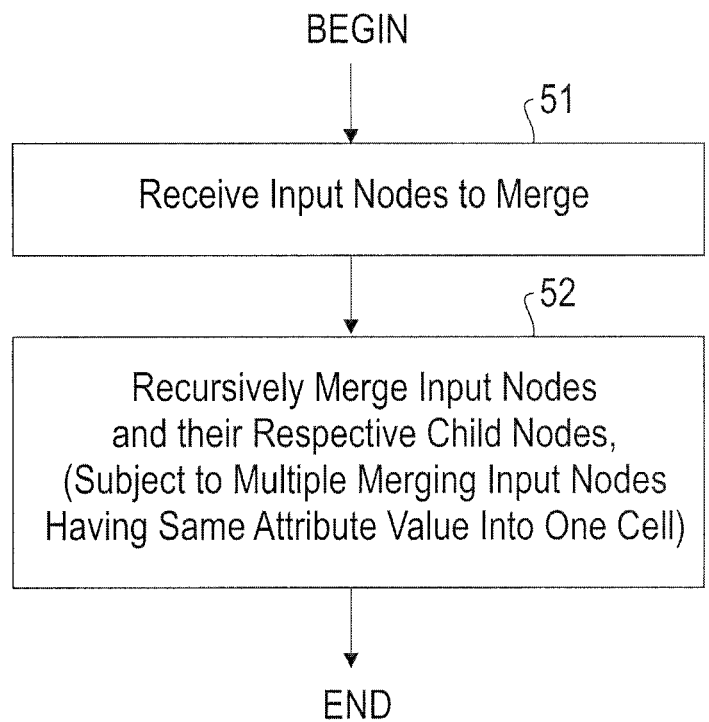
FIG. 27 is a flow chart based on the pseudocode of Algorithm 3 in FIG. 19 for merging nodes of a prefix tree, in accordance with embodiments of the present invention.

FIG. 27 is a flow chart based on the pseudocode of Algorithm 3 in FIG. 19 for merging nodes of a prefix tree, in accordance with embodiments of the present invention. The merge procedure of FIG. 27 comprises steps 51-52 and may be utilized to implement merge step 28 of FIG. 24.

Step 51 receives the input nodes to merge. These input nodes are assumed to be at a same hierarchical level of the prefix tree and to represent nodes descendant from the node associated with the slice being processed in the traverse of FIG. 24.

Step 52 recursively merges the input nodes and their respective child nodes. For the input nodes, step 52 generates a new node that includes a unique cell for each distinct attribute value of the input nodes to merge. Multiple input nodes having the same attribute value are merged into one cell of the new node, and the child cells of the multiple input nodes having the same attribute value are merged into a child cell of this one cell of the new node. For example, when nodes (3), (6), (9) in FIG. 6 are merged as illustrated in FIGS. 8(*d*) and 8(*e*), the resultant new node M5 comprises a cell that contains the same Phone attribute value 3478 of nodes (3) and (9), as shown in FIG. 8(*e*). Moreover a child node M6 associated with this one cell of node M5 is the result of merging child cells (4) and (10) of parent nodes (3) and (9), respectively, such that the associated Emp No attribute values of 10 and 20 of child cells (4) and (10), respectively, have been merged into node M6.

3.3 Finding Non-Keys

In the pseudocode of Algorithm 4 as depicted in FIG. 20, the NonKeyFinder routine ( ) performs the modified DF-traversal, as introduced supra in Section 3.1.4, of the prefix tree, and appropriately merges nodes to discover non-keys. NonKeyFinder takes the root of a prefix tree and the corresponding level number (i.e., the attribute number as in FIG. 6) as input. For the tree in FIG. 6, the initial call to NonKeyFinder has root equal to node (1) and attrNo=0, which corresponds to the first-level attribute First Name. Recall that the attribute number (attrNo) is the level number of the prefix tree. The variable curNonKey (which identifies the current segment being processed) is static and global, and is initialized to be empty prior to the first (topmost) call to NonKeyFinder. As mentioned supra, NonKeyFinder consults and updates the NonKeySet container which records, in a compressed manner, a non-redundant set of the non-keys discovered so far. Algorithm 4 is carefully designed to avoid producing redundant non-keys: a redundant non-key will either not be discovered due to the invocation of one of the pruning methods, or will be discovered but immediately eliminated upon insertion into the NonKeySet container.

The algorithm for finding non-keys can be summarized as follows. The path from the root to the current node being visited specifies the current slice under consideration, and the variable curNonKey contains the current non-key candidate (i.e., current segment) that NonKeyFinder is working on for the slice. When NonKeyFinder visits a node, NonKeyFinder appends attrNo to curNonKey (Line 1) and then processes the contents of the node. Then NonKeyFinder removes attrNo from curNonKey (Lines 9 and 22), merges the cells of the node using Algorithm 3, and recursively visits the root of the merged prefix tree.

Figure 9:
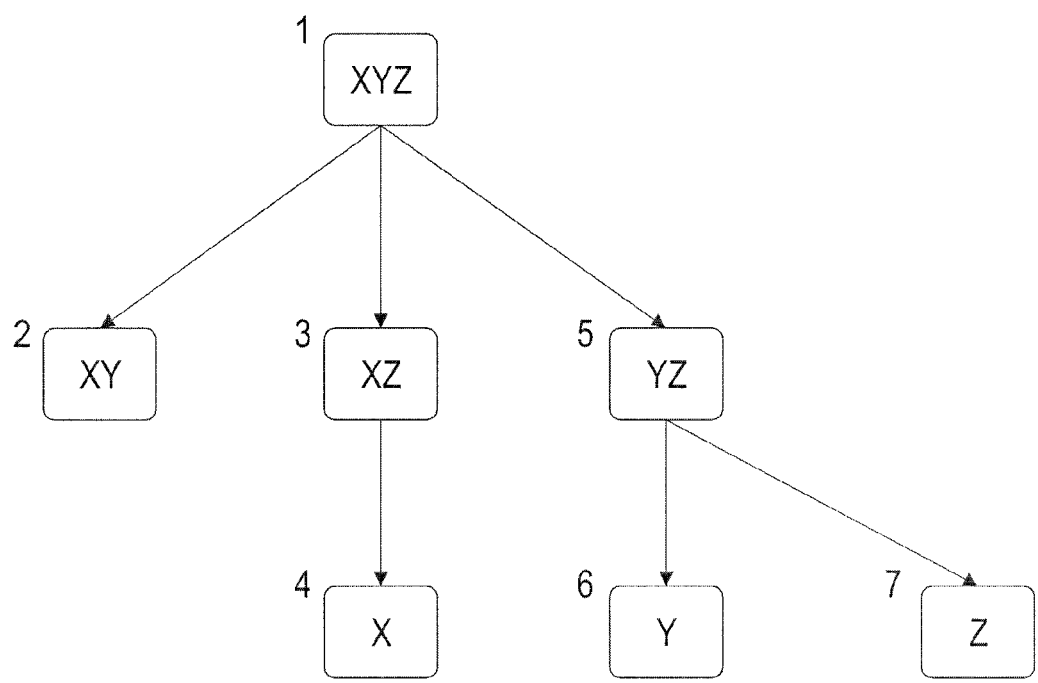
FIG. 9 depicts the order in which segments of a current slice are processed by the Gordian algorithm for a dataset such that the segments of the current slice each comprise a subset of three attributes, in accordance with embodiments of the present invention.

FIG. 9 depicts the order in which segments of the current slice are processed by the Gordian algorithm for a dataset such that the segments of the current slice each comprise a subset of three attributes (X, Y, Z), in accordance with embodiments of the present invention. The 7 combinations of X, Y, and Z (i.e., the 7 segments of the current slice) shown in FIG. 9 are traversed in the order shown, namely: 1, 2, 3, 4, 5, 6, 7. If the effects of the pruning mechanisms described in subsequent sections are ignored, then for the current slice under consideration the order in which NonKeyFinder would traverse all possible non-keys is as depicted in FIG. 9. This ordering makes possible the pruning mechanism described infra in Section 3.4.

Algorithm 4 in FIG. 20 processes an input node (called root) of the prefix tree being processed and curNonKey denotes a candidate non-key associated with node root. In Algorithm 4, when NonKeyFinder processes a leaf node (i.e., root denotes a leaf node) of the prefix tree, NonKeyFinder first checks whether any of counters in the cells of the input node exceeds 1 and if so, NonKeyFinder adds curNonKey to the NonKeySet container (Line 5). Then NonKeyFinder removes attrNo from curNonKey, merging the cells of the leaf node, and then checking if the counter value exceeds 1. Actually, the foregoing operation can be optimized, as in Line 10; i.e., if there is more than one cell in the leaf node or the count of the only cell in the leaf node exceeds 1, then curNonKey is indeed a non-key and is inserted into the NonKeySet container (Line 11).

When NonKeyFinder processes a non-leaf node (i.e., root denotes a non-leaf node), NonKeyFinder first recursively visits all the children of the cells in the node (Line 19). Then after removing attrNo from the current non-key candidate curNonKey, NonKeyFinder merges the cells in the node using Algorithm 3 (see supra Section 3.2.2) and recursively visits the merged prefix tree (Line 28), which it discards afterwards (Line 29). Caution is required when discarding a merged prefix tree to ensure that any shared nodes are retained. In one embodiment, a reference-counting scheme may be used to this end.

3.4 Search Space Pruning

Pruning techniques in the Gordian algorithm speed up NonKeyFinder by orders of magnitude without affecting accuracy. As mentioned supra, singleton pruning is based on relationships between slices, whereas futility pruning is based on previously discovered non-keys.

3.4.1 Singleton Pruning

As explained supra, the sharing of prefix-tree nodes significantly reduces time and space requirements when computing slices of the cube. This section describes an additional benefit of node sharing, namely a pruning of redundant searches.

Figure 10:
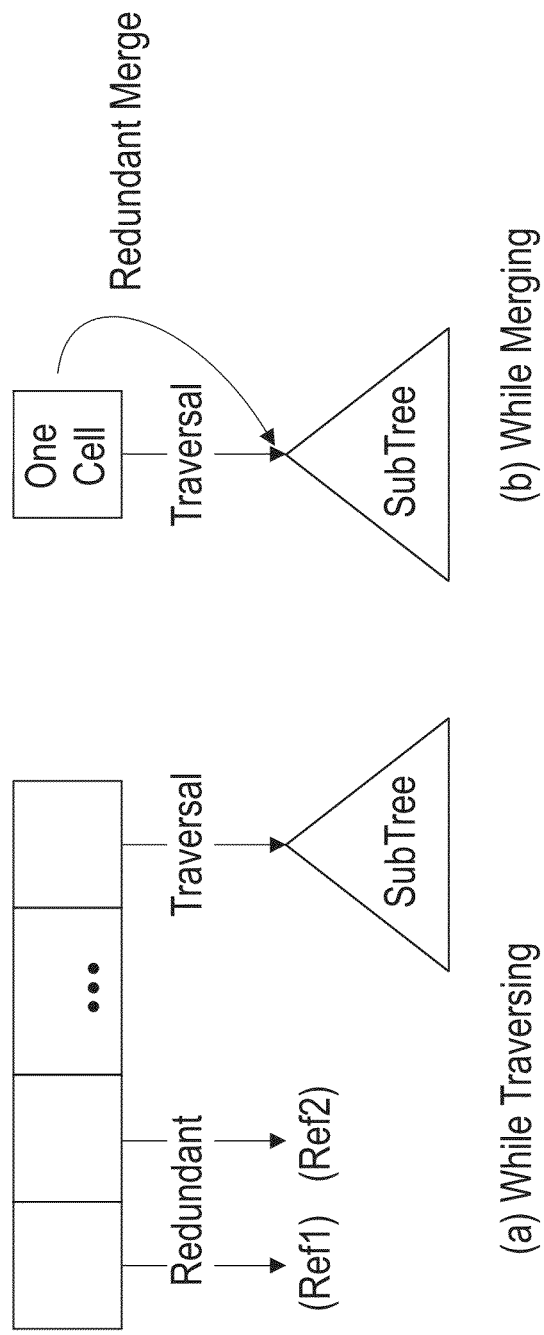
FIG. 10 illustrates singleton pruning, in accordance with embodiments of the present invention.

FIG. 10 illustrates singleton pruning, in accordance with embodiments of the present invention. FIG. 10(a) illustrates singleton pruning performed while traversing the prefix tree. FIG. 10(a) illustrates singleton pruning performed while merging nodes of the prefix tree.

When NonKeyFinder processes a node, the path from the root to the node specifies the current slice L under consideration. It may be the case that some cells of the node point to shared and previously traversed prefix (sub)trees, as in FIG. 8(d) or, more generally, FIG. 10(a). In such cases, NonKeyFinder does not need to traverse these subtrees again. To see this, observe that the mere fact that the node points to a previously traversed subtree means that there exists a previously processed slice F that subsumes L in the sense discussed supra in Section 3.1.2 (e.g., see Lemma 1). As discussed in Section 3.1.2, this subsumption means that any non-key discovered in L will be redundant to a previously discovered non-key in F. This observation is exploited in NonKeyFinder by pruning the search in line 18 of Algorithm 4 in FIG. 20.

FIG. 10(b) illustrates an extension of this pruning idea, when a node with just one cell is being processed, the merging operation will return a shared prefix tree and thus cannot provide any non-redundant non-keys. This extension is exploited in line 23 of Algorithm 4 in FIG. 20.

As a final optimization, if NonKeyFinder encounters a prefix tree (i.e., a slice) that corresponds to just one entity, it does not search the tree (line 14 of Algorithm 4 in FIG. 20). Such a search is unnecessary because no count can exceed 1, and hence the tree cannot yield any non-keys.

Although singleton pruning provides the advantages indicated supra, the scope of the present invention also includes an embodiment in which singleton pruning is not performed.

3.4.2 Futility Pruning

This pruning operation prevents NonKeyFinder from merging and searching trees that can generate only redundant non-keys. Futility pruning, unlike singleton pruning, uses the non-key container to discover if searching can be pruned.

Recall that if K is a non-key, then $K' \subset K$ implies that K' is a non-key. NonKeyFinder takes advantage of this property by checking for such futile segments before merging them. The non-key container holds all of the non-keys seen so far. Before creating a new prefix tree, NonKeyFinder checks (line 24 of Algorithm 4 in FIG. 20) whether there exists a non-key in the non-key container that covers all of the possible non-keys that could be found. The coverage test for all such paths can be performed very efficiently using bitmaps; see Section 3.6.

Figure 28:
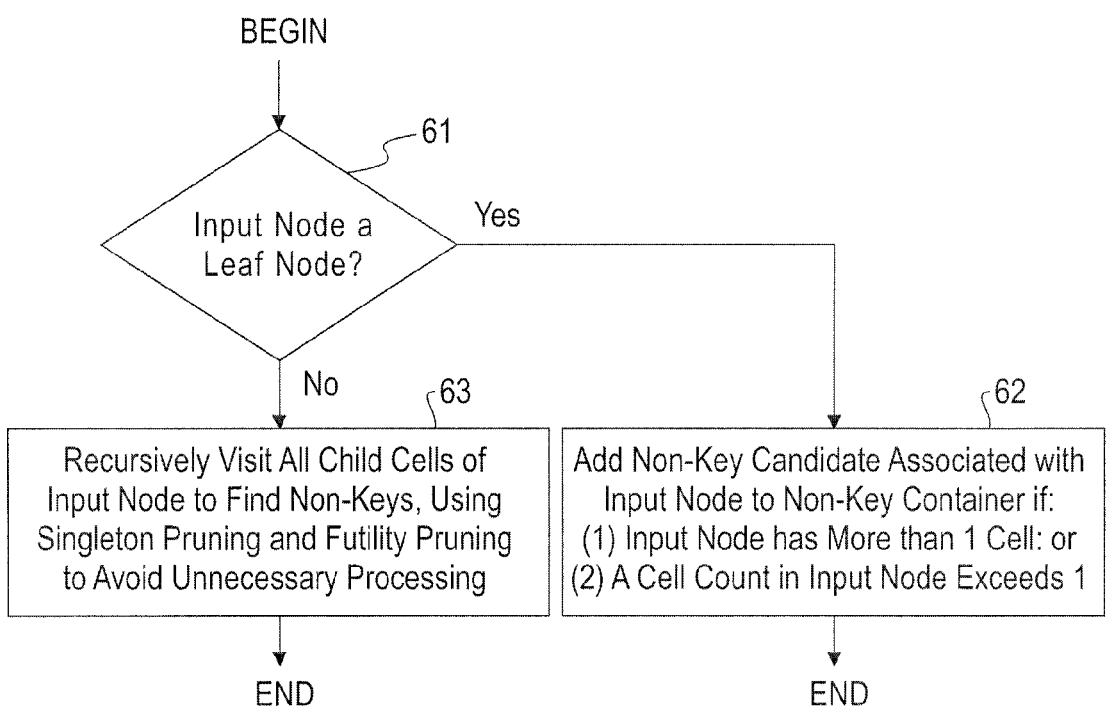
FIG. 28 is a flow chart based on the pseudocode of Algorithm 4 in FIG. 20 for finding non-keys, in accordance with embodiments of the present invention.

Although futility pruning provides the advantages indicated supra, the scope of the present invention also includes an embodiment in which futility pruning is not performed 3.4.3 Flow Chart For Finding Non-Keys FIG. 28 is a flow chart based on the pseudocode of Algorithm 4 in FIG. 20 for finding non-keys, in accordance with embodiments of the present invention. The procedure for finding non-keys in FIG. 28 comprises steps 61-63. The flow chart of FIG. 28 incorporates the flow chart of FIGS. 23-24 without showing all of the details of FIGS. 23-24. In addition, the flow chart of FIG. 28 depicts singleton pruning and futility pruning. The flow chart of FIG. 28 processes an input node defining a slice of the prefix tree and attempts to find non-keys by exploring candidate non-keys associated with the segments of the slice being processed.

Step 61 determines whether the input node is a leaf node. If step 61 determines that the input node is a leaf node, then step 62 concludes that the candidate non-key associated with the input node is a non-key if the input node has more than one cell or if the input node consists of one cell that has a count exceeding 1 (as depicted in lines 10-11 of Algorithm 4 of in FIG. 20). If step 61 determines that the input node is not a leaf node, then step 63 recursively visits the child cells of the input node to find non-keys, using singleton pruning and futility pruning to avoid unnecessary processing as described supra. As described supra, use of singleton pruning is depicted in Algorithm 4 in FIG. 20 in lines 10-11 (see also FIG. 10(a)) and line 23 (see also FIG. 10(b)). Futility pruning is depicted in Algorithm 4 in FIG. 20 in lines 24-25.

3.5 An Example of NonKeyFinder Operation

In this section, the NonKeyFinder is illustrated by being applied it to the prefix tree in FIG. 6. Although the dataset of FIG. 6 contains only four entities with four attributes each, the dataset is sufficient to demonstrate all of the concepts discussed so far.

NonKeyFinder performs a DF-traversal on the prefix tree. It starts with the root node (1) and proceeds recursively to nodes (2) and (3) until it arrives at leaf node (4). The current slice therefore corresponds to the entity "Michael, Thompson, 3478, 10". During this recursive traversal, NonKeyFinder builds up the sequence of attributes in curNonKey, i.e. [First Name, Last Name, Phone, EmpNo]. Because the count of the (only) cell in (4) equals 1, NonKeyFinder does not find a non-key. The next segment (i.e., non-key candidate) is curNonKey=[First Name, Last Name, Phone]. Since cell '3478' has only one child, no non-key is found.

Recursively, NonKeyFinder now follows the child pointer of cell '6791' to node (5). The current slice now is "Michael, Thompson, 6791, 50" and, just as at node (4), NonKeyFinder doesn't find any non-keys for [First Name, Last Name, Phone, Emp No] and [First Name, Last Name, Phone]. NonKey-Finder backtracks to node (3), thereby increasing the slice to the two entities "Michael, Thompson, 3478, 10" and "Michael, Thompson, 6971,50". Because all the children of node (3) have been traversed, NonKeyFinder merges these children and creates a new prefix tree with a single node (M1); node (M1) is depicted in FIG. 8(a). The merge operation essentially projects out the Phone attribute from the current slice. The next candidate non-key is now [First Name, Last Name, EmpNo].

NonKeyFinder now traverses (M1). Because all of the cells in the leaf node (M1) have counter values equal to 1, no non-keys are discovered. NonKeyFinder is now finished with (M1) and projects out the leaf attribute (EmpNo) to obtain the new candidate non-key [First Name, Last Name]. Since (M1) has more than one cell, NonKeyFinder discovers the first non-key [First Name, Last Name] and inserts it into the non-key container. Node (M1) is then discarded.

The recursion backtracks to node (2), so that the current slice is based on all three 'Michael' entities. NonKeyFinder now follows the child pointer of the cell with value 'Spencer' and reaches node (6). As node (6) has only one cell, singleton pruning [as in FIG. 10(b)] stops the traversal immediately. NonKeyFinder examines a new segment by merging the children of node (2), thereby creating a prefix tree with node (M2) [FIG. 8(b)]. The traversal would now proceed recursively to nodes (4), (5) and (7). However, since all of these nodes have been traversed before, singleton pruning [as in FIG. 10(a)] terminates the traversal immediately and NonKeyFinder merges nodes (4), (5) and (7) to create a prefix tree with node (M3) [FIG. 8(c)], i.e., the current candidate non-key is set to curNonKey=[First Name, EmpNo]. By traversing Node (M3) we see that all aggregate counts in the cells are equal to 1, and therefore no non-keys are found. NonKeyFinder now needs to see whether [First Name] is a non-key. Since we are at the leaf level, a naive procedure would scan node (M3) to see whether this node has more than one cell. But as we have already determined that [First Name, Last Name] is a non-key (this is checked via the NonKeySet container), we know that [First Name] would be a redundant non-key. Hence, futility pruning immediately aborts the search.

NonKeyFinder now backtracks to node (1), follows the child pointer of the cell with value 'Sally', and proceeds in a manner similar to that described above. The algorithm eventually discovers the only other non-key, namely [Phone], when it merges the children of the cells in node (1). The search ultimately terminates, having found the non-keys [First Name, Last Name] and [Phone].

3.6 Non-Key Container

FIG. 21 depicts pseudocode of Algorithm 5, which is an algorithm for inserting a non-key into the NonKeySet container that holds a current set of non-redundant non-keys during NonKeyFinder processing, in accordance with embodiments of the present invention. The algorithm goes over the non-keys in the container to check if any of them cover NonKey (Lines 2 to 7). If no covering non-key can be found, then the algorithm removes any previously inserted non-keys that are now covered by NonKey during a second pass (Lines 8 to 15). The last step of the second pass inserts NonKey into the container (Line 14). A bitmap representation is used for non-keys, where each bit corresponds to an attribute of R, both for compactness and for efficiency when performing the redundancy test and other operations.

Figure 29:
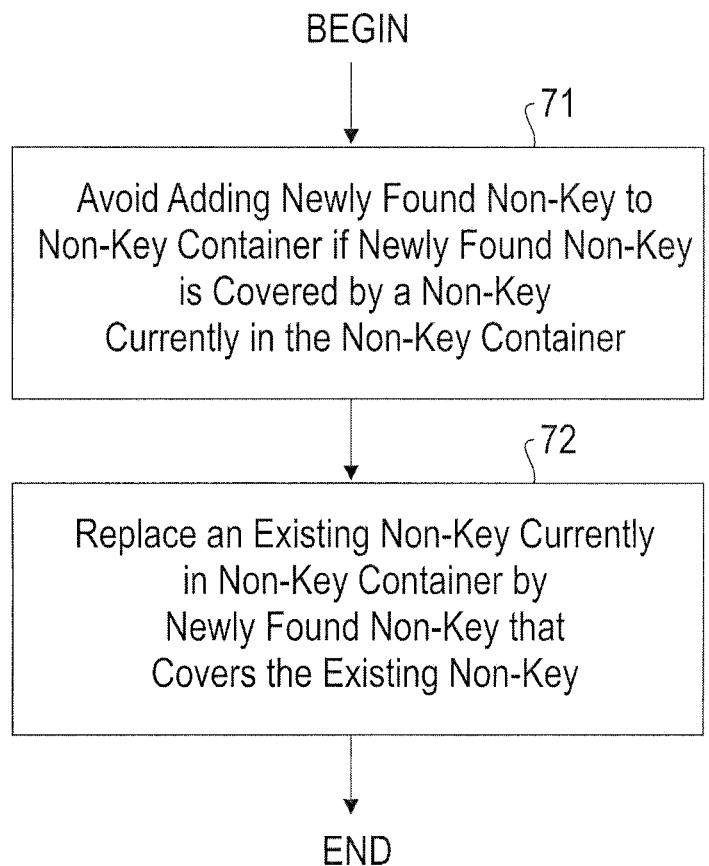
FIG. 29 is a flow chart based on the pseudocode of Algorithm 5 in FIG. 21 for constraining the non-key container to hold a minimal set of non-keys, in accordance with embodiments of the present invention.

FIG. 29 is a flow chart based on the pseudocode of Algorithm 5 in FIG. 21 for constraining the non-key container to hold a minimal set of non-keys, in accordance with embodiments of the present invention. A minimal set of non-keys is a non-redundant set of non-keys. The flow chart in FIG. 29 comprises steps 71-72.

Step 71 avoids adding a newly found non-key to the non-key container if the newly found non-key is covered by a non-key currently in the container. For example, if the previously found non-key [First Name, Last Name] is currently in the non-key container and if [First Name] is subsequently discovered to be a non-key, then [First Name] will not be inserted into the non-key container, because [First Name] is covered by [First Name, Last Name] and is thus redundant. Step 71 reflects lines 1-7 of Algorithm 5 in FIG. 21.

Step 72 replaces an existing non-key currently in the non-key container by a newly found non-key that covers the existing non-key. For example, if the existing non-key [First Name] is currently in the non-key container, and if [First Name, Last Name] is subsequently discovered to be a non-key, then the subsequently discovered non-key [First Name, Last Name] will replace the existing non-key [First Name] in the non-key container, because [First Name, Last Name] covers [First Name], and [First Name] is thus redundant to [First Name, Last Name]. Step 72 reflects lines 8-15 of Algorithm 5 in FIG. 21.

3.7 Computing Keys From Non-Keys

The final step of the GORDIAN algorithm is to compute a non-redundant set of discovered keys from the set of discovered non-keys. The basic idea is that the set of keys corresponds to the cartesian product of the complement sets (see Section 2) of the N non-redundant non-keys. To see this, observe that an element of this Cartesian product $K=<A_1, A_2, \ldots, A_N>$ has the property that it is not covered by any of the non-keys, because $A_1$ is not covered by the first non-key, $A_2$ is not covered by the second non-key, and so forth. If K were a non-key, then it would be covered by at least one of the non-redundant non-keys in the NonKeySet container, but it is not, and hence must be a key. Thus the complement set for each non-key may be computed taking the cartesian product with the previously-seen complement sets, and pruning any redundant keys on the fly (where redundancy is defined as at the end of Section 2).

FIG. 22 depicts pseudocode of Algorithm 6, which performs the conversion from non-keys to keys, in accordance with embodiments of the present invention. Algorithm 6 performs the conversion, using the variable KeySet to store the set of keys that will be returned and the variables complementSet and newSet to hold extra sets of keys for bookkeeping purposes. The algorithm reads the first non-key and assigns the complement set of the non-key to complementSet (line 3). In the present running example, the algorithm computes the complement of the non-key [First Name, Last Name] which is the set of candidate keys [Phone] and [EmpNo]. The KeySet is currently empty, so complementSet is assigned to KeySet and the algorithm proceeds to the next non-key. Again, complementSet gets the complement set of the non-key. In the present running example, the next non-key is [Phone] whose complement set is the candidate keys [First Name], [Last Name] and [EmpNo]. Now, for each candidate key pkey in the complementSet and for each key Key already inserted in KeySet, the union (line 10) of pKey and Key is inserted into the set newSet. Then all redundant keys are removed from newSet and newSet is assigned to KeySet.

The final result is:

| Key |
|---|
| <EmpNo> |
| <First Name, Phone> |
| <Last Name, Phone> |

Figure 30:
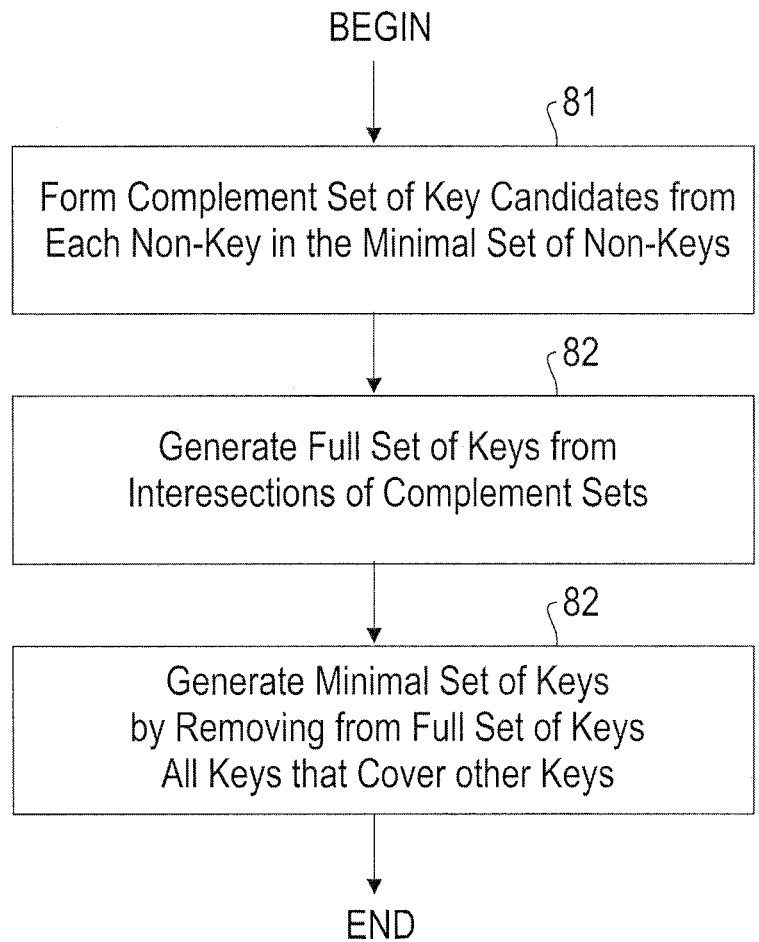
FIG. 30 is a flow chart based on the pseudocode of Algorithm 6 in FIG. 21 for determining a minimal set of keys, in accordance with embodiments of the present invention.

FIG. 30 is a flow chart based on the pseudocode of Algorithm 6 in FIG. 21 for determining a minimal set of keys, in accordance with embodiments of the present invention. The input is the minimal set of non-keys in the non-key container. The flow chart in FIG. 30 comprises steps 81-83.

Step 81 forms a complement set of key candidates from each non-key in the minimal set of non-keys in the non-keys container. In the present example, the minimal set of non-keys consists of [First Name, Last Name] and [Phone]. The complement of [First Name, Last Name] is [Phone] and [Emp No], and the associated complement set of key candidates are [Phone] and [Emp No] and all attribute combinations that cover each of [Phone] and [Emp No]. For example, [Phone] and [Emp No] are covered by the attribute combinations of: [Phone, First Name], [Phone, Last Name], [Phone, First Name, Last Name], . . . , [Emp No, First Name], [Emp No, Last Name], [Emp No, First Name, Last Name], . . . . Similarly, the complement keys of [Phone] are [First Name], [Last Name], and [Emp No], and the associated complement set of key candidates are [First Name], [Last Name], [Emp No], and all attribute combinations that cover each of [First Name], [Last Name], and [Emp No].

Step 82 generates a full set of keys from the intersections of the complement sets of key candidates resulting from step 81. The intersection of the complement sets of key candidates consists of those key candidates existing in each complement set of key candidates, which in the present example comprise: [Emp No], [First Name, Phone], [Last Name, Phone], [Emp No, Phone], [Emp No, First Name], [Emp No, Last Name], . . . .

Step 83 generates a minimal set of keys, by removing from the full set of keys determined in step 82, all keys that cover other keys in the full set of keys, which results in the following minimal set of keys: [Emp No], [First Name, Phone], and [Last Name, Phone]. As a result of step 83, the output of the Gordian algorithm is the minimal set of keys.

In one embodiment, step 83 is not performed, and the output of the Gordian algorithm is the full set of keys resulting from step 82.

In one embodiment, step 83 is partially performed such that some but not all keys that cover other keys in the full set of keys are selectively removed based on a one or more rules or criteria, and the output of the Gordian algorithm is the less than full set of keys and more than the minimal set of keys. As an example, the critera could be to remove from the full set of keys in step 83 only those keys that comprise three or more attributes, leaving composite keys of two attributes covering unitary keys.

3.8 Complexity

Determining the complexity of any sophisticated data-driven algorithm is a challenging task, because it is hard to model all pertinent properties of the data distribution. In the present invention, which deals with multi-dimensional datasets, attribute correlations make the problem even harder. In the general case, the problem of finding a minimal composite key is NP-complete and indeed (highly artificial) datasets, on which the behavior of our algorithm is exponential, can be constructed. See D. Gunopulos, R. Khardon, H. Mannila, S. Saluja, H. Toivonen, and R. S. Sharma, Discovering all most specific sentences, *ACM Trans. Database Syst.*, 28(2):140-174, 2003. However, as described in Section 4, the Gordian algorithm performs well on a wide variety of real-world and synthetic datasets.

The following result helps explain the Gordian algorithm's good empirical performance. Due to lack of space, the proof is omitted. The proof is rather long and uses arguments similar to those in Y. Sismanis and N. Roussopoulos, The Polynomial Complexity of Fully Materialized Coalesced Cubes, In *Proc. VLDB*, 2004. In the following, suppose that 1. The frequencies for each attribute follow a generalized Zipfian distribution with parameter $\theta$, so that the frequency of the ith most frequent value is proportional to $i^{-\theta}$.
2. The only pruning employed by the Gordian algorithm is the sub-case of singleton pruning in which the subsumed slice L is based on a single entity. This assumption is conservative in that, in actuality, the Gordian algorithm will apply the other available pruning methods, and hence be much more efficient.
3. There are no correlations among the attributes. Note that real data tends to have many complex correlation patterns. Such patterns greatly benefit the Gordian algorithm because they lead to a lot of pruning; thus this assumption is also conservative.

Theorem 1. Under Assumptions 1-3 above, the time complexity of the Gordian algorithm is $$O\left(s \cdot d \cdot T^{1+\frac{1+\theta}{\log_d C}} + s^2\right)$$

and the memory complexity is $O(d \cdot T)$, where s is the number of mutually non-redundant non-keys, d is the number of attributes, C is the average cardinality (number of distinct values) of the attributes, and T is the number of entities.

For uniform data ($\theta=0$) in which each entity has 30 attributes and 5,000 distinct values per attribute, $1+(\log_d C)^{-1} \approx 1.4$, which implies that the time complexity scales almost linearly with the number of entities. The $s^2$ term in the complexity expression reflects the cost of computing the keys from the non-keys, and uses the fact that the number of keys is $O(s)$. Although the statistical assumptions of the theorem rarely hold exactly in the real world, experiments by the inventor of the present invention shows that the Gordian algorithm's actual performance is clearly superior to the exponential time and polynomial (at best) space requirements of the brute-force approach.

3.9 Sampling

Instead of processing every entity in a dataset of size T, a sample of the entities can be processed, with the goal of making the Gordian algorithm scalable to very large datasets. The Gordian algorithm, when applied to a sample, will discover all of the keys in the dataset, but will also discover false keys, i.e., sets of attributes that are keys for the sample but not for the entire dataset. Some false keys can be useful, however, if their strength, defined as the number of distinct key values in the dataset divided by the number of entities, is sufficiently high. A set of attributes whose strength is close to 1 is called an approximate key. (Of course, a true key has strength equal to 1.) Kivinen and Mannila show that, in general, a minimum sample size of $(T^{1/2} \epsilon^{-1}(d+\log \delta^{-1}))$ is needed to ensure that, with probability $(1-\delta)$, the strength of each key discovered in a sample exceeds $1-\epsilon$. See J. Kivinen and H. Mannila, Approximate dependency inference from relations, *Theoret.*

*Comput. Sci.,* 149:129-149, 1995. Here, as before, T is the number of entities and d is the number of attributes. This sample size can be large for typical values of the parameters. As with the algorithmic complexity results cited previously, however, the datasets used to establish this theoretical result are rather artificial. For the more realistic datasets considered in the present experiments, it was found that the Gordian algorithm can use a relatively small sample and still produce a high quality set of true and approximate keys.

Precise assessment and control of the strength of the discovered keys is an extremely challenging problem. Indeed, estimation of the strength of a set of attributes is closely related to the notoriously difficult problem of sampling-based estimation of the number of distinct values in a population [16]. See P. J. Haas and L. Stokes, Estimating the number of classes in a finite population, *J. Amer. Statist. Assoc.,* 93:1475-1487, 1998. The state-of-the-art estimation algorithms are quite expensive to apply in the current setting, so that this topic is not pursued further. Interestingly, we found in the present experiments that, with fairly high probability, the quantity $$L(K) = 1 - \prod_{v \in K} \frac{N - D_v + 1}{N + 2}$$

is a reasonably tight lower bound on the strength of a sample-based discovered key K, where N is the sample size and $D_v$ is the number of distinct values of attribute v in the sample. This quantity is derived via an approximate Bayesian argument similar to the derivation of Laplace's "rule of succession". See Sec. 7.10 of T. M. Cover and J. A. Thomas, *Elements of Information Theory,* Wiley, 1991.

3.10 Flexible Schemata

In the more general case where the entities do not have exactly the same schema (i.e. the set of attributes changes slightly from one entity to another), the algorithms presented here work unchanged with a slight modification. The "Largest Schema" is defined as the union of the attributes of all the entities. Each entity is mapped to the largest schema using a special <null> value for the missing attributes. Attributes that contain the <null> value cannot be part of a (composite) key by definition. The corresponding attribute levels of the prefix tree are pruned in a preprocessing step before the Gordian algorithm executes.

4 Experiments

The inventors of the present invention implemented the Gordian algorithm on top of DB2 V8.2 and applied this prototype to several synthetic, real-world, and benchmark datasets. First, Gordian algorithm was validated over these datasets and the Gordian algorithm was compared to other key-discovery algorithms. The impact of sample size was examined on the Gordian algorithm's accuracy and speed, as well as the overall impact of the Gordian algorithm on query execution times.

4.1 Experimental Setup

The Gordian algorithm was evaluated on a number of real and synthetic datasets. The TPC-H dataset corresponds to the synthetic database described in http://www.tpc.org/tpch/default.asp. The OPIC dataset is a real-world database containing product information for a large computer company. The BASEBALL dataset contains real data about baseball players, teams, awards, hall-of-fame membership, and game/player statistics for the baseball championship in Australia. Table 1 displays some summary characteristics of the datasets. All experiments were performed on a UNIX machine with one 2.4 GHz processor and 1 GB of RAM. Unless stated otherwise, results are reported for experiments on the OPIC dataset; results for the other datasets are similar.

TABLE 1

Dataset Characteristics.

| Dataset | Number of Tables | Average #Attributes | Maximum #Attributes | # Tuples (Entities) |
|---|---|---|---|---|
| TPC-H | 8 | 9 | 17 | 866,602 |
| OPIC | 106 | 17 | 66 | 27,757,807 |
| BASEBALL | 12 | 16 | 40 | 262,432 |

4.2 Performance Comparison

Figure 11:
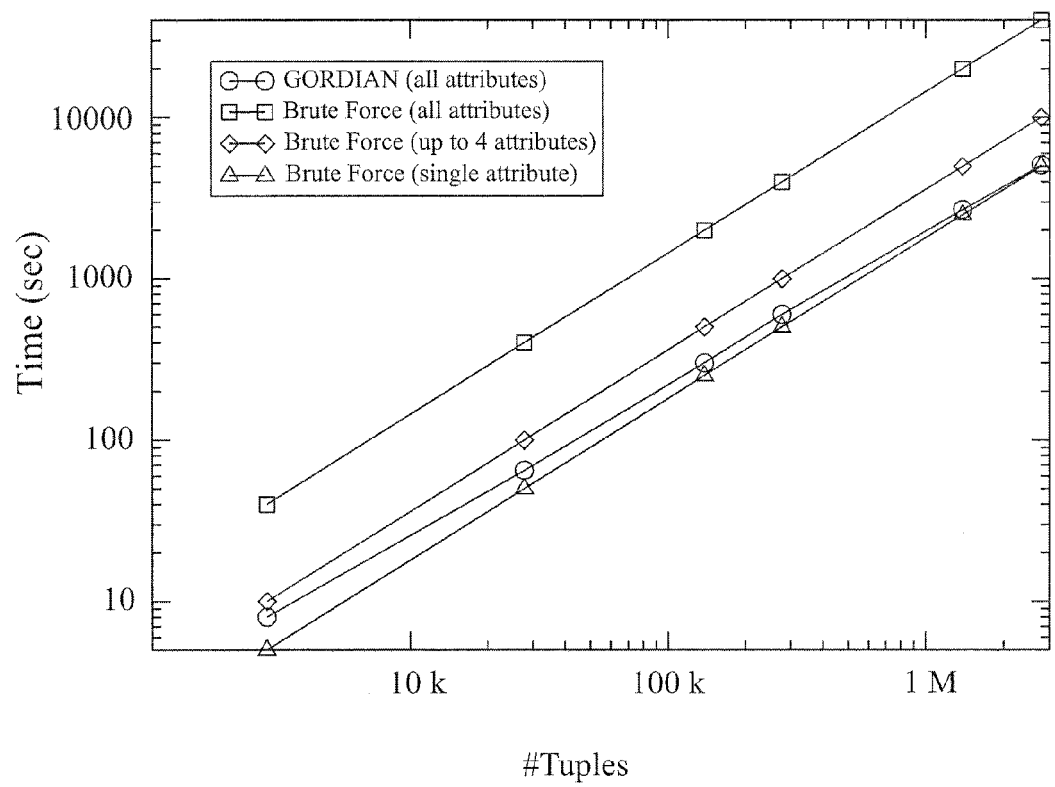
FIG. 11 is a graph comparing the Gordian algorithm's processing time and memory requirements to brute force algorithms, in accordance with embodiments of the present invention.

In accordance with embodiments of the present invention, FIG. 11 and Table 2 compares the Gordian algorithm's processing time and memory requirements to: (1) a brute-force algorithm that finds all composite keys by checking all possible combinations; (2) the brute force algorithm, but limited to finding composite keys with at most four attributes; and (3) same as (2), but limited to single-attribute keys only. As can be seen, for roughly the same time and memory needed by a brute-force algorithm to find single-attribute keys, the Gordian algorithm can find all composite strict keys, as well as approximate keys.

To study how the number of dimensions affects the relative performance of the foregoing algorithms, the Gordian algorithm was run on a sequence of datasets having increasingly many attributes. To obtain this sequence, a relation in the OPIC dataset that has 50 attributes was selected, and the relation was projected onto 5 attributes, then 10 attributes, and so forth.

Figure 12:
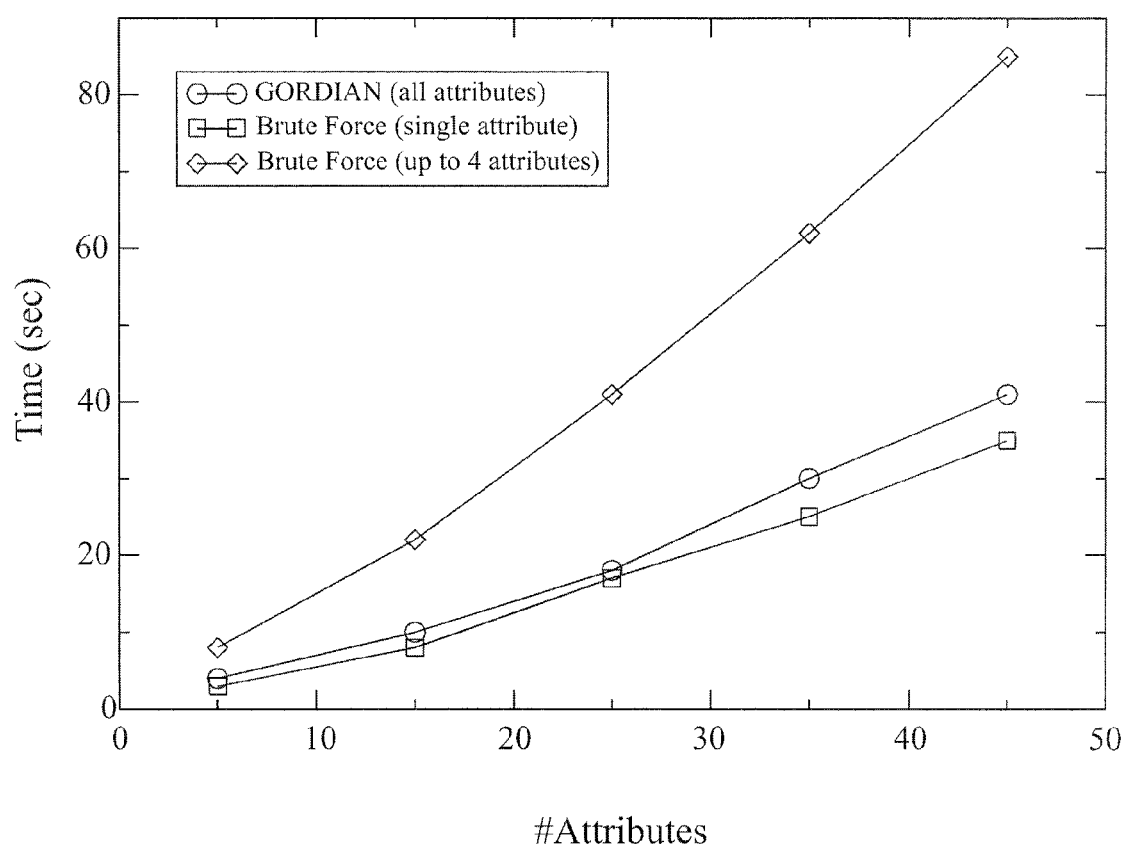
FIG. 12 is a plot of performance of the Gordian algorithm versus the number of attributes, in accordance with embodiments of the present invention.

FIG. 12 is a plot of performance of the Gordian algorithm versus the number of attributes, in accordance with embodiments of the present invention. FIG. 12 shows that the Gordian algorithm scales almost linearly with the number of attributes and that, although it finds all composite keys, its performance is very close to the approach that just checks for single-attribute keys. For readability results for the brute-force approach that checks all possible combinations of attributes were not displayed; these times were orders of magnitude slower than the rest.

TABLE 2

Maximum Memory Usage.

| Dataset | GORDIAN | Up to four-attribute keys | Single-keys |
|---|---|---|---|
| TPC-H | 12 MB | 240 MB | 6 MB |
| OPIC | 100 MB | 600 MB | 77 MB |
| BASEBALL | 6 MB | 30 MB | 4 MB |

Figure 13:
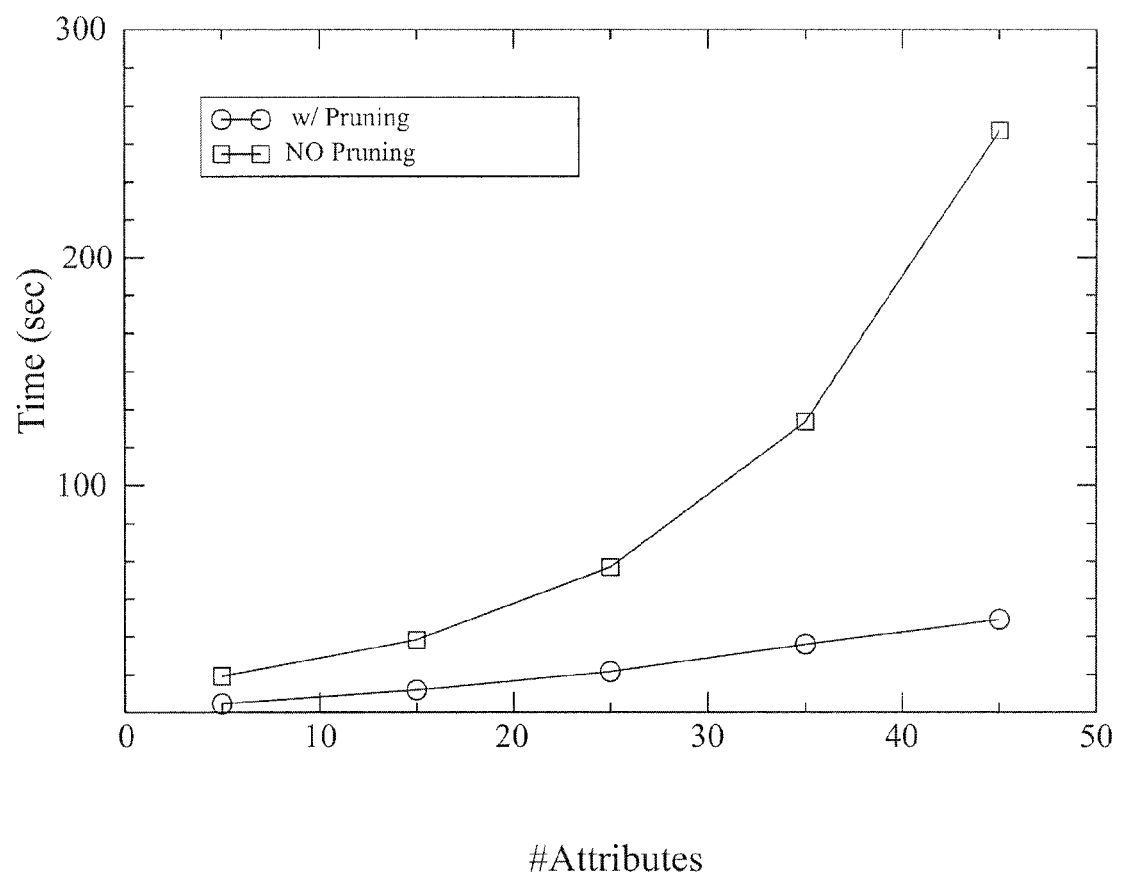
FIG. 13 shows the effect of the Gordian algorithm's pruning methods, in accordance with embodiments of the present invention.

FIG. 13 shows the effect of the Gordian algorithm's pruning methods, in accordance with embodiments of the present invention. FIG. 13 shows that singleton pruning and futility pruning together speed up processing by orders of magnitude.

4.3 Effect of Sample Size

Because, as shown above, the Gordian algorithm's execution time scales almost linearly with the number of entities, it follows that the execution time is an almost linear function of the sample size. Thus the Gordian algorithm is applicable even to very large datasets.

Figure 14:
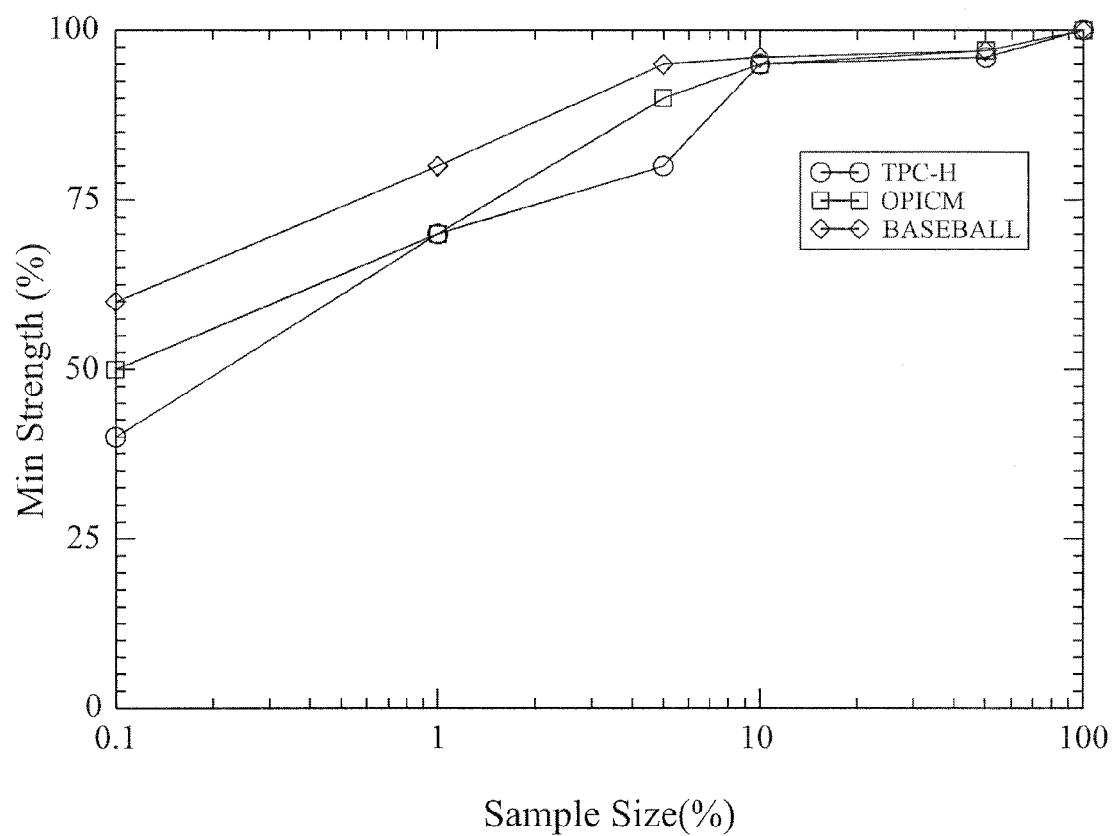
FIG. 14 shows the minimum strength found for each of the datasets at various sample sizes, in accordance with embodiments of the present invention.

Of course, the Gordian algorithm identifies not only strict keys but also approximate keys when it operates on a sample of the data; see Section 3.9. FIG. 14 shows the minimum strength found for each of the datasets at various sample sizes, in accordance with embodiments of the present invention.

The strength was computed exactly, by performing the projection of the full dataset on the key attributes (eliminating duplicates) and dividing by the total number of tuples. It is observed that even with fairly small sample sizes, the Gordian algorithm finds a useful set of approximate keys, i.e., having high strength.

Figure 15:
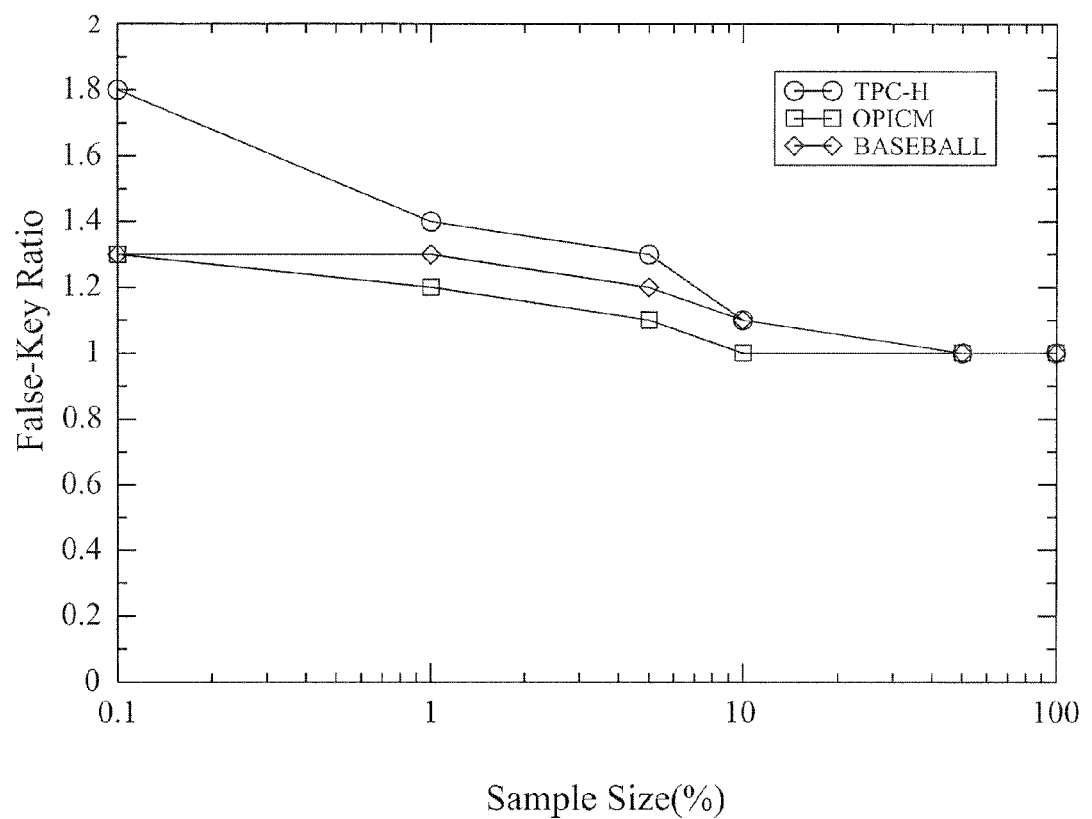
FIG. 15 depicts the effect of sample size on accuracy in accordance with embodiments of the present invention.

To further study the effect of sample size on accuracy, a false key was defined as a key with a strength <80%, and the ratio of false keys to true (strict) keys was examined as the sample size varied. The results are displayed in FIG. 15 which depicts the effect of sample size on accuracy in accordance with embodiments of the present invention. Again, the Gordian algorithm yields acceptable results even at fairly small sample sizes.

4.4 Application to Query Execution

Figure 16:
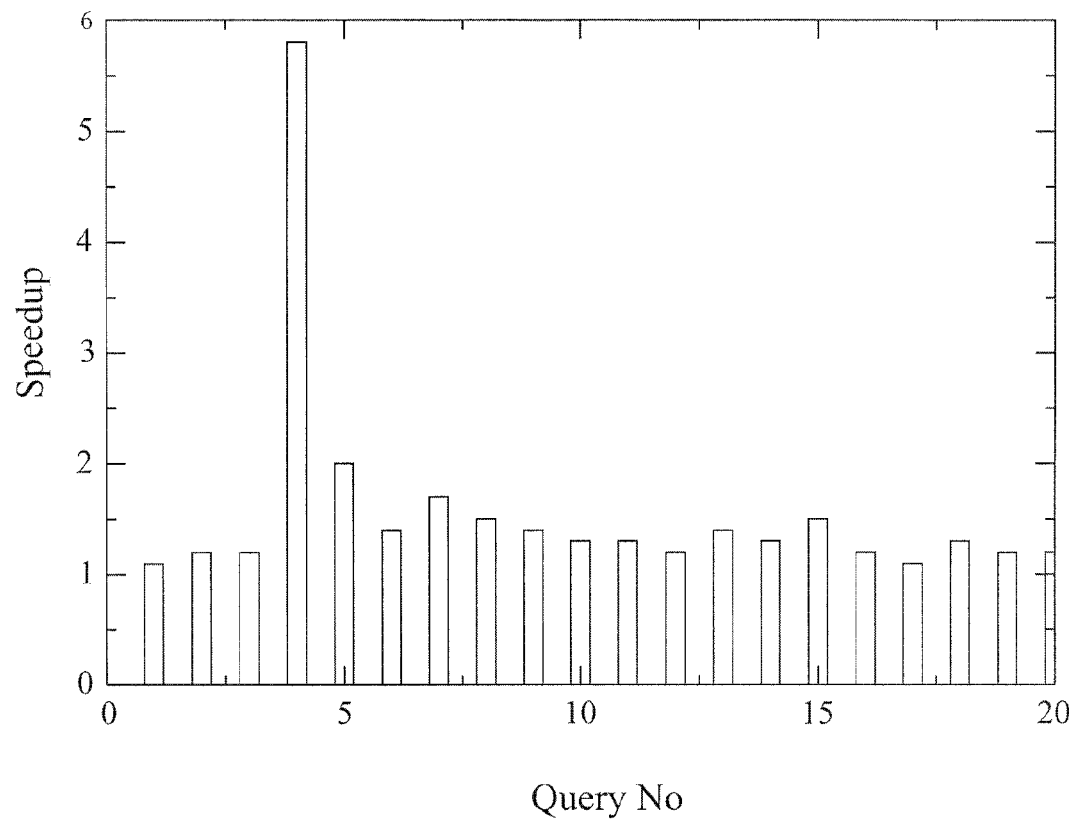
FIG. 16 displays the resulting speedups obtained for a workload of 20 typical warehouse queries, in accordance with embodiments of the present invention.

As discussed supra, there are many possible uses for the keys discovered by the Gordian algorithm. This section discusses one interesting and important use for such keys in the context of query optimization. In this setting, the Gordian algorithm proposes a set of indexes that correspond to the discovered keys. Such a set serves as the search space for an "index wizard" that tries to speed up query processing by selecting the most appropriate indexes based on available storage, workload characteristics, maintenance considerations, and so forth. The applicability of GORDIAN for index recommendation was explored using a synthetic database with a schema similar to TPC-H. The largest table had 1,800,000 rows and 17 columns. GORDIAN required only 2 minutes to discover the candidate indexes. Because there was sufficient storage available, of the candidate indexes were built. FIG. 16 displays the resulting speedups obtained for a workload of 20 typical warehouse queries, in accordance with embodiments of the present invention. For query 4, the speedup was dramatic ($\approx$6 times) because the index covered all of the attributes in the query, so that the query was processed using only index pages.

5. Usefulness of the Gordian Algorithm

The Gordian algorithm is a data-driven method which works directly on the base data. However, the Gordian algorithm can be enhanced to exploit workload information or other DBA knowledge in order to further prune the search space. The use of sampling reduces significantly the overhead of processing and makes the Gordian algorithm applicable to real-world environments with thousands of datasets, hundreds of attributes and millions of entities. The Gordian also works well with updates, since usual referential constraints or triggers can be set to check for the continuing validity of a key.

Thus the Gordian algorithm is a novel technique for efficiently identifying all composite keys in a dataset. This capability is crucial for many different data management tasks such as data modeling, data integration, query formulation, query optimization, and indexing. The Gordian algorithm allows the discovery of composite keys while avoiding the exponential processing and memory requirements that limit the applicability of brute-force methods to very small data sets. The Gordian algorithm can be used to find keys in any collection of entities (e.g., relational tables or XML repositories). The empirical study reported herein has demonstrated that the Gordian algorithm has excellent real-world performance, discovering all composite keys in the time that previous approaches required to find single-attribute keys. The study also shows that the Gordian algorithm, when combined with sampling, can quickly find high quality sets of approximate keys in very large datasets. The Gordian algorithm can be effectively used for index recommendation, resulting in dramatic speedups in query processing.

6. Computer System

Figure 31:
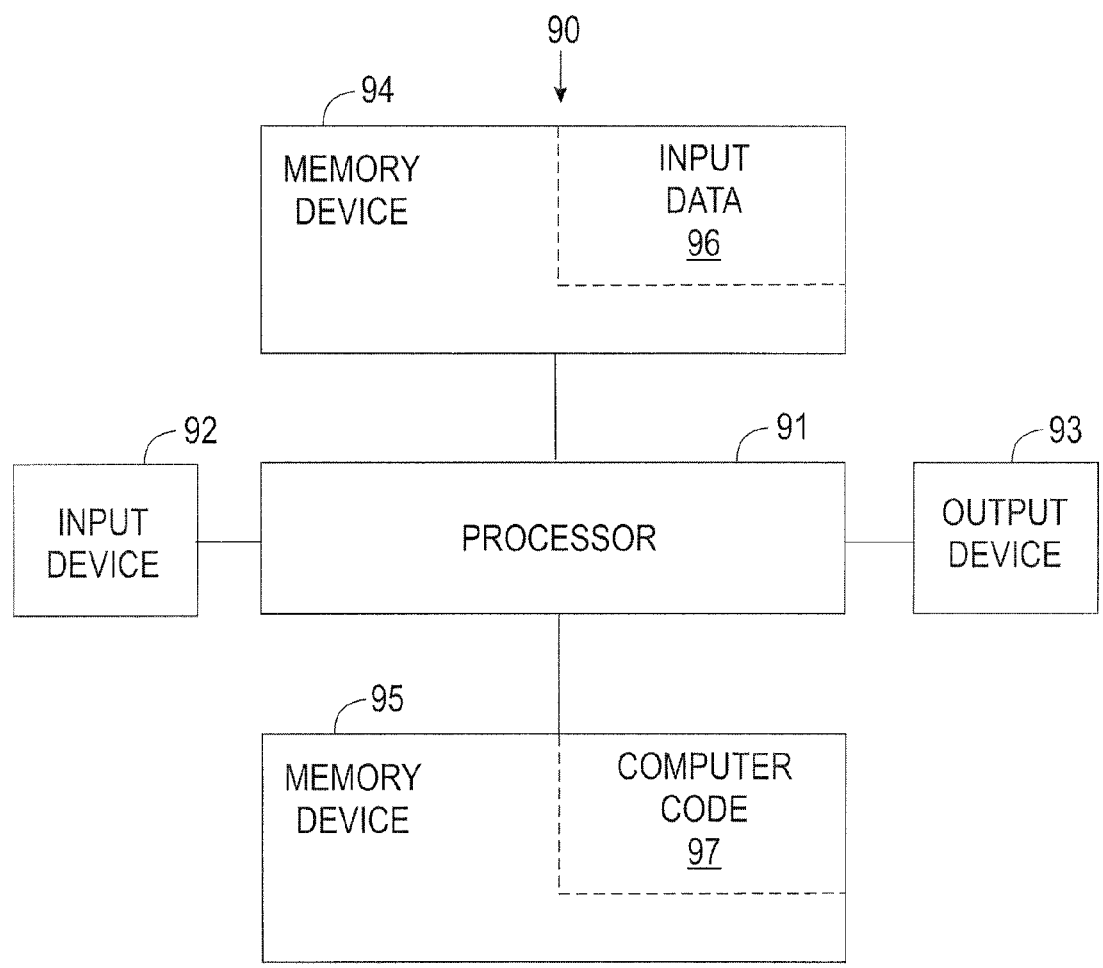
FIG. 31 illustrates a computer system used for determining keys in a database, in accordance with embodiments of the present invention.

FIG. 31 illustrates a computer system 90 used for determining keys in a database, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes an algorithm for determining keys in a database. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 31) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

While FIG. 31 shows the computer system 90 as a particular configuration of hardware and software, any configuration of hardware and software, as would be known to a person of ordinary skill in the art, may be utilized for the purposes stated supra in conjunction with the particular computer system 90 of FIG. 31. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for discovering keys in a database, said method comprising:

a processor of a computer system finding a minimal set of non-keys of the database, said database comprising a plurality of entities and a plurality of attributes, said minimal set of non-keys comprising a plurality of non-keys, each entity independently comprising a value of each attribute; and said processor generating a set of keys of the database from the minimal set of non-keys, each key of the generated set of keys independently being a unitary key consisting of one attribute of the plurality of attributes or a composite key consisting of at least two attributes of the plurality of attributes.

2. The method of claim 1, wherein said generating the set of keys comprises:

forming a complement set of key candidates from each non-key in the minimal set of non-keys; and generating a full set of keys from the intersections of the complement sets of key candidates.

3. The method of claim 2, wherein said generating the set of keys further comprises:
generating a minimal set of keys by removing from the full set of keys all keys that cover other keys in the full set of keys.

4. The method of claim 1, wherein at least one key of the generated set of keys is a composite key.

5. The method of claim 1, wherein the method further comprises:
generating a prefix tree comprising hierarchical levels and nodes distributed at said levels and linked together hierarchically by paths within the tree, a root node of said nodes being at the highest level of said levels, said levels corresponding to said attributes on a one-to-one basis, each node comprising one or more cells, each cell comprising the value of one of said attributes, all child nodes of any one node of said nodes having a common prefix of the path through the tree from the root node to the any one node,
wherein said finding the minimal set of non-keys comprises traversing selected segments of selected slices of the prefix tree, and wherein said traversing comprises finding non-keys of the database via analysis of the cells of the leaf nodes visited during said traversing.

6. The method of claim 5, wherein the selected slices consist of all slices of the prefix tree.

7. The method of claim 5, wherein the selected slices do not include any slice subsumed by a selected slice whose selected segments have been previously traversed.

8. The method of claim 5, wherein the selected slices do not include any slice corresponding to one and only one entity.

9. The method of claim 5, wherein the selected slices do not include any segment covered by a segment previously found to correspond to a non-key.

10. The method of claim 5, wherein said finding non-keys via said analysis of the cells of the leaf nodes visited during said traversing comprises determining that any visited leaf node comprises a non-key if said any visited leaf node comprises more than one cell or consists of one cell having a count of 1, and wherein said count is the number of identical paths in the tree from the root node to the visited leaf node.

11. The method of claim 5, wherein said traversing comprises recursively traversing the segments of the selected slices of the prefix tree.

12. The method of claim 5, wherein said traversing each selected slice comprises:
recursively traversing all children of a unique node of the prefix tree that identifies each selected slice; and
recursively merging the child nodes descending from the unique node that identifies each selected slice.

13. The method of claim 12, wherein said recursively merging comprises performing a recursive merge of input nodes descending from the unique node that identifies each slice of the selected slices, and wherein said performing said recursive merge comprising generating a new node that includes a unique cell for each distinct attribute value of the input nodes being merged.

14. The method of claim 13, wherein the input nodes comprise multiple nodes having a same attribute value, wherein the multiple nodes are merged into one cell of the new node, and wherein the child cells of the multiple nodes having a same attribute value are merged into a child cell of this one cell of the new node.

15. The method of claim 5, wherein said traversing comprises selectively storing the found non-keys in a non-key container, and wherein said selectively storing does not store in the non-key container any newly found non-key that is covered by a non-key currently in the non-key container.

16. The method of claim 5, wherein said traversing comprises selectively storing the found non-keys in a non-key container, and wherein said selectively storing comprises replacing an existing non-key currently in the non-key container by a newly found non-key that covers the existing non-key.

17. A computer program product, comprising a computer readable storage medium having a computer readable program code embodied therein, said computer readable program code containing instructions that when executed by a processor of a computer system implement a method for discovering keys in a database, said method comprising:
finding a minimal set of non-keys of the database, said database comprising a plurality of entities and a plurality of attributes, said minimal set of non-keys comprising a plurality of non-keys, each entity independently comprising a value of each attribute; and
generating a set of keys of the database from the minimal set of non-keys, each key of the generated set of keys independently being a unitary key consisting of one attribute of the plurality of attributes or a composite key consisting of at least two attributes of the plurality of attributes.

18. The computer program product of claim 17, wherein the method further comprises:
generating a prefix tree comprising hierarchical levels and nodes distributed at said levels and linked together hierarchically by paths within the tree, a root node of said nodes being at the highest level of said levels, said levels corresponding to said attributes on a one-to-one basis, each node comprising one or more cells, each cell comprising the value of one of said attributes, all child nodes of any one node of said nodes having a common prefix of the path through the tree from the root node to the any one node,
wherein said finding the minimal set of non-keys comprises traversing selected segments of selected slices of the prefix tree, and wherein said traversing comprises finding non-keys of the database via analysis of the cells of the leaf nodes visited during said traversing.

19. A computer system comprising a processor and a computer readable memory unit coupled to the processor, said memory unit containing instructions that when executed by the processor implement a method for discovering keys in a database, said method comprising:
finding a minimal set of non-keys of the database, said database comprising a plurality of entities and a plurality of attributes, said minimal set of non-keys comprising a plurality of non-keys, each entity independently comprising a value of each attribute; and
generating a set of keys of the database from the minimal set of non-keys, each key of the generated set of keys independently being a unitary key consisting of one attribute of the plurality of attributes or a composite key consisting of at least two attributes of the plurality of attributes.

20. The computer system of claim 19, wherein the method further comprises:
generating a prefix tree comprising hierarchical levels and nodes distributed at said levels and linked together hierarchically by paths within the tree, a root node of said nodes being at the highest level of said levels, said levels corresponding to said attributes on a one-to-one basis, each node comprising one or more cells, each cell comprising the value of one of said attributes, all child nodes of any one node of said nodes having a common prefix of the path through the tree from the root node to the any one node, wherein said finding the minimal set of non-keys comprises traversing selected segments of selected slices of the prefix tree, and wherein said traversing comprises finding non-keys of the database via analysis of the cells of the leaf nodes visited during said traversing.

* * * * *